US012689656B2

(12) United States Patent
Baskaran

(10) Patent No.: US 12,689,656 B2
(45) Date of Patent: Jul. 21, 2026

(54) SYSTEMS AND METHODS FOR REAL TIME DEEPFAKE IDENTIFICATION IN VIRTUAL MEETINGS

(71) Applicant: Project Karna Inc., Portland, OR (US)

(72) Inventor: Rajashree Baskaran, Portland, OR (US)

(73) Assignee: Project Karna Inc., Portland, OR (US)

( * ) Notice: Subject to any disclaimer, the term of this patent is extended or adjusted under 35 U.S.C. 154(b) by 31 days.

(21) Appl. No.: 18/786,971

(22) Filed: Jul. 29, 2024

(65) Prior Publication Data

US 2026/0032151 A1     Jan. 29, 2026

(51) Int. Cl.
*H04L 9/40*          (2022.01)
(52) U.S. Cl.
CPC ...... *H04L 63/1483* (2013.01); *H04L 63/0861* (2013.01)
(58) Field of Classification Search
CPC .................. H04L 63/1483; H04L 63/0861
See application file for complete search history.

(56) References Cited

U.S. PATENT DOCUMENTS

| | | | |
|---|---|---|---|
| 8,750,076 B2 | 6/2014 | Miyamoto et al. | |
| 12,259,957 B1 * | 3/2025 | Lyle ........................ | G10L 25/51 |

| | | | |
|---|---|---|---|
| 12,380,190 B1 * | 8/2025 | Lyle ........................ | G06F 21/32 |
| 2024/0111846 A1 * | 4/2024 | Grover ..................... | G06F 21/16 |
| 2024/0291826 A1 * | 8/2024 | Croak ................... | H04L 63/102 |
| 2025/0126543 A1 * | 4/2025 | Law ....................... | H04W 48/02 |
| 2025/0284780 A1 * | 9/2025 | Kronenberg ............ | G06F 21/31 |

OTHER PUBLICATIONS

Filonenko et al., Investigating Ultrasonic Positioning on Mobile Phones, International Conference on Indoor Positioning and Indoor Navigation (IPIN), Sep. 15-17, 2010, Zurich, Switzerland.

* cited by examiner

*Primary Examiner* — Anthony D Brown
*Assistant Examiner* — Kamryn J Gillespie
(74) *Attorney, Agent, or Firm* — Aambell PC

(57)          ABSTRACT

An authenticating application may send instructions to a device to generate and emit an ultrasonic signal, the device being associated with a user having access credential to a virtual meeting. The application may receive in real time from the virtual meeting, audio data associated with the access credential. The application may search the audio data for the ultrasonic signal. Responsive to finding the ultrasonic signal in the audio data, the application may categorize the access credential as authentic and allow the access credential into the virtual meeting. Responsive to not finding the ultrasonic signal in the audio data, the application may categorize the access credential as unauthentic and reject the access credential from the virtual meeting.

20 Claims, 17 Drawing Sheets

1500

```
┌─────────────────────────────────────────────────────────┐
│  SEND INSTRUCTIONS TO A DEVICE TO GENERATE AND EMIT AN   │  ── 1502
│  ULTRASONIC KEY, THE DEVICE BEING ASSOCIATED WITH A USER │
│      HAVING ACCESS CREDENTIAL TO A VIRTUAL MEETING       │
└─────────────────────────────────────────────────────────┘
                          │
                          ▼
┌─────────────────────────────────────────────────────────┐
│  RECEIVE IN REAL TIME FROM THE VIRTUAL MEETING AUDIO DATA│  ── 1504
│         ASSOCIATED WITH THE ACCESS CREDENTIAL            │
└─────────────────────────────────────────────────────────┘
                          │
                          ▼
┌─────────────────────────────────────────────────────────┐
│        SEARCH THE AUDIO DATA FOR THE ULTRASONIC KEY      │  ── 1506
└─────────────────────────────────────────────────────────┘
```

1508 — ULTRASONIC KEY FOUND IN AUDIO DATA?  — NO

YES

1510 — ULTRASONIC KEY ENCODES CRYPTOGRAPHIC KEY? — NO

YES

```
┌─────────────────────────────────────────────────────────┐
│  CATEGORIZE THE ACCESS CREDENTIAL AS AUTHENTIC AND       │
│  ALLOW THE ACCESS CREDENTIAL INTO THE VIRTUAL MEETING    │
└─────────────────────────────────────────────────────────┘
```
1512

1514

```
┌─────────────────────────────────────────────────────────┐
│     CATEGORIZE THE ACCESS CREDENTIAL AS UNAUTHENTIC      │
│  AND REJECT THE ACCESS CREDENTIAL FROM THE VIRTUAL MEETING│
└─────────────────────────────────────────────────────────┘
```

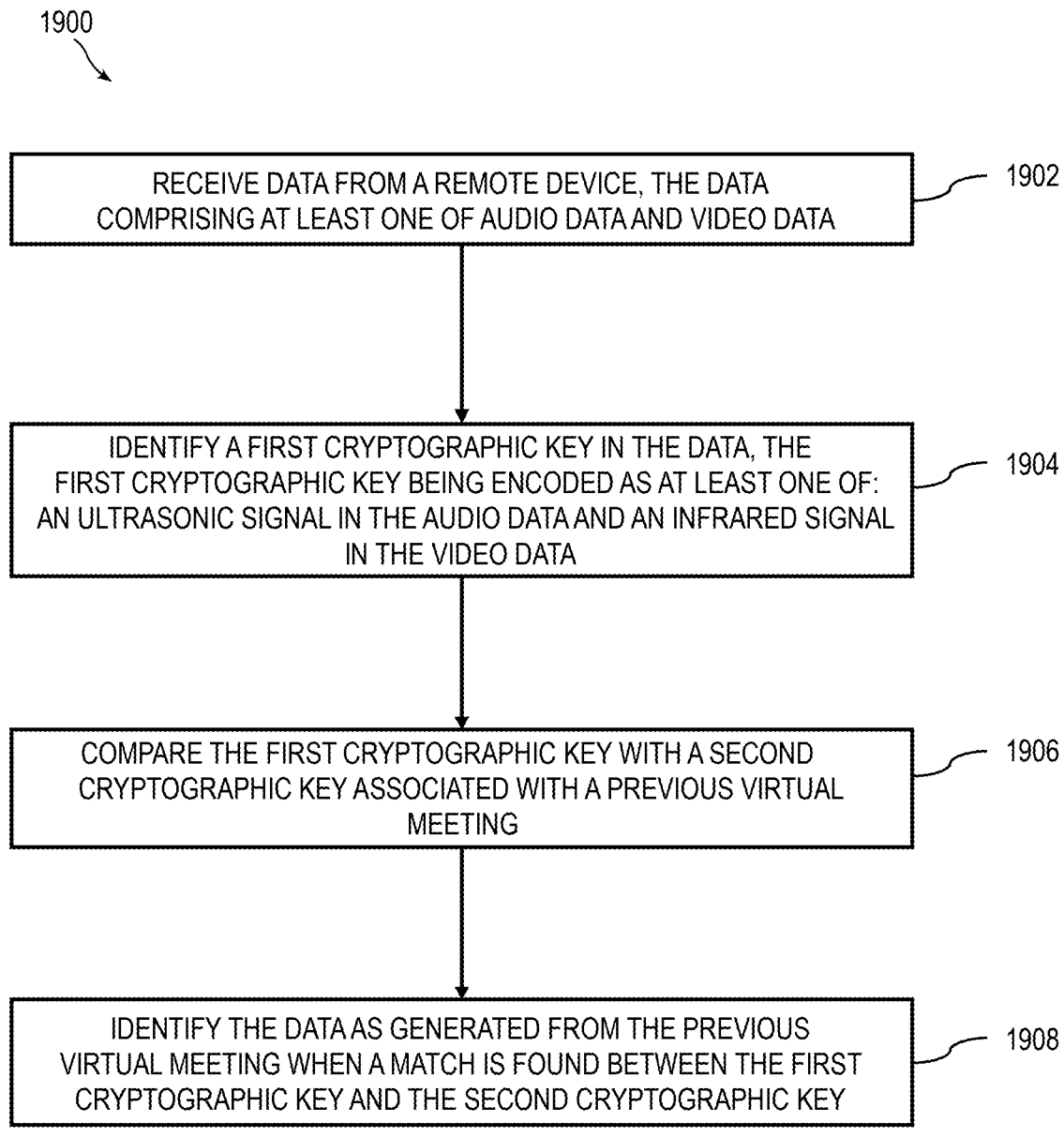

1900

RECEIVE DATA FROM A REMOTE DEVICE, THE DATA COMPRISING AT LEAST ONE OF AUDIO DATA AND VIDEO DATA — 1902

IDENTIFY A FIRST CRYPTOGRAPHIC KEY IN THE DATA, THE FIRST CRYPTOGRAPHIC KEY BEING ENCODED AS AT LEAST ONE OF: AN ULTRASONIC SIGNAL IN THE AUDIO DATA AND AN INFRARED SIGNAL IN THE VIDEO DATA — 1904

COMPARE THE FIRST CRYPTOGRAPHIC KEY WITH A SECOND CRYPTOGRAPHIC KEY ASSOCIATED WITH A PREVIOUS VIRTUAL MEETING — 1906

IDENTIFY THE DATA AS GENERATED FROM THE PREVIOUS VIRTUAL MEETING WHEN A MATCH IS FOUND BETWEEN THE FIRST CRYPTOGRAPHIC KEY AND THE SECOND CRYPTOGRAPHIC KEY — 1908

FIG. 19

SYSTEMS AND METHODS FOR REAL TIME DEEPFAKE IDENTIFICATION IN VIRTUAL MEETINGS

BACKGROUND

Deepfakes are synthetic media created using artificial intelligence (AI) techniques, particularly deep learning algorithms. They manipulate audio, video, or images to depict people doing or saying things they never did. Using deepfakes, malicious actors could impersonate individuals, such as corporate executives or government officials, to gain unauthorized access to sensitive information or perform social engineering attacks. Thus, this technology raises concerns about misinformation, privacy violations, and its potential to deceive viewers, posing challenges for digital trust and authenticity in media and communication. On average, organizations spend roughly 15% of their time in meetings. Deepfakes, along with social engineering, have the potential to create a new, large attack surface in virtual meetings.

BRIEF DESCRIPTION OF DRAWINGS

Embodiments will be readily understood by the following detailed description in conjunction with the accompanying drawings. To facilitate this description, like reference numerals designate like elements. Embodiments are illustrated by way of example, and not by way of limitation, in the figures of the accompanying drawings. For convenience, if a collection of drawings designated with different letters are present (e.g., FIGS. 3A-3C), such a collection may be referred to herein without the letters (e.g., as "FIG. 3").

FIG. 15 is a simplified flow diagram of an example method for real time deepfake identification in virtual meetings according to some embodiments disclosed herein.

FIG. 19 is a simplified flow diagram of yet another example method in the system for real time deepfake identification in virtual meetings, according to some embodiments disclosed herein.

DETAILED DESCRIPTION

Overview

Figure 1:
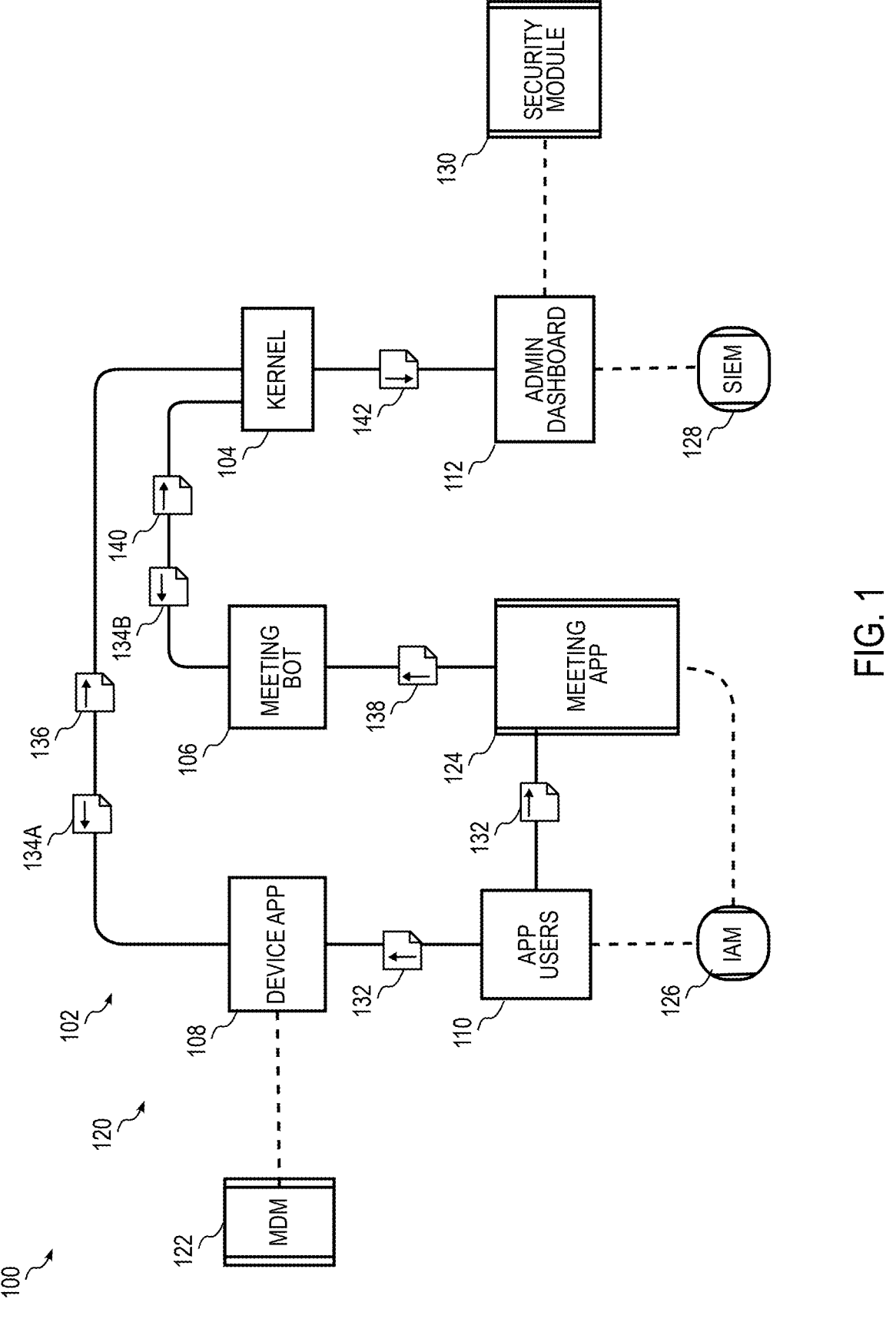
FIG. 1 is a simplified block diagram illustrating a system for real time deepfake identification in virtual meetings, according to an example embodiment.

For purposes of illustrating the embodiments described herein, it is important to understand certain terminology and operations of technology networks. In the following detailed description, various aspects of the illustrative implementations may be described using terms commonly employed by those skilled in the art to convey the substance of their work to others skilled in the art.

The term "microphone" as used herein refers to any equipment that converts sound waves (i.e., acoustic energy) into electrical signals (i.e., electromagnetic energy), which can then be amplified, recorded, or transmitted wired or wirelessly. The microphone captures audio signals (i.e., sound waves) from sources such as voices, musical instruments, ultrasonic emitters, ambient sounds, etc.

The term "camera" as used herein refers to any equipment that captures and records electromagnetic signals having wavelengths between approximately 380 nanometers and 1 millimeter, for example, optical signals such as visual images or videos, and infrared radiation. The camera typically consists of a lens system that focuses the electromagnetic signals onto one or more of an optical sensor, infrared sensor, or a combination of optical and infrared sensors, which converts the incoming light into electronic signals that can be amplified, recorded, or transmitted wired or wirelessly.

The term "infrared" as used herein refers to electromagnetic radiation having wavelengths between approximately 700 nanometers and 1 millimeter. An infrared source is any equipment that generates infrared radiation (i.e., infrared signals). In some embodiments described herein, the infrared source comprises one or more of a solid-state electronic element that can be electrically excited to emit electromagnetic radiation in the wavelength range specified above. An example of an infrared source is a light emitting diode (LED) configured to emit light in the infrared wavelength range specified above; such LEDs may be referred to as infrared LEDs herein.

The term "ultrasonic" refers to sound waves having frequencies above approximately 20 kHz. An ultrasonic emitter is any equipment that emits ultrasonic sound (i.e., sound wave signals). Ultrasonic emitters may utilize piezo-electric materials such as quartz, ceramics or polymers configured into a transducer element, for example, by sand-wiching between metal electrodes. Some devices such as a smartphone may be natively equipped with ultrasonic emit-ters that are used variously, for example, as proximity detectors, gesture recognition, etc.

The term "device" as used herein means a desktop com-puter, a laptop computer, a smartphone, a touch pad, a tablet computer, a notebook computer, an electronic gadget, or any device with a microprocessor, such as a central processing unit (CPU), general processing unit (GPU), or other such electronic component capable of executing processes of a software algorithm (such as a software program, code, application, macro, etc.).

The term "biometric" refers to measurable biological or behavioral characteristics of an individual such as heart rate, sweating rate, blood pressure, fingerprints, iris patterns, and voice patterns.

The term "module" refers to a software program, software tool, and/or algorithm that is to perform a particular func-tion, execute a particular set of instructions, or may be comprised in a logical unit that may be distributed or localized in one or more hardware components. The module may include various circuitry and electronic components that facilitate the operations thereof. In this disclosure, the term "module" may be expressly stated, or may be implied based on functionality or operation of the associated com-ponent without departing from the scope of the embodi-ments.

The term "application" refers to a software program or a set of software tools to perform specific functions or tasks, providing users with tools and capabilities to accomplish various activities. It includes instructions encoded and stored in a suitable memory and in some cases, a frontend comprising a graphical user interface (GUI) that allows users to interact with the application through menus, icons, buttons, and other visual elements. The application may be distributed (e.g., stored and/or executing in different devices, processors, etc.) and accessed over a cloud network, or local (e.g., stored and/or executing in a single device or proces-sor). The application may execute within a specific operating system (e.g., Windows™, macOS™, iOS™, Android™, etc.) or it may be web-based, accessible through a suitable web browser.

The term "connected" means a direct connection (which may be one or more of a communication, mechanical, and/or electrical connection) between the things that are connected, without any intermediary devices, while the term "coupled" means either a direct connection between the things that are connected, or an indirect connection through one or more passive or active intermediary devices.

The description uses the phrases "in an embodiment" or "in embodiments," which may each refer to one or more of the same or different embodiments.

Although certain elements may be referred to in the singular herein, such elements may include multiple sub-elements. For example, "a controller" may include one or more controllers.

Unless otherwise specified, the use of the ordinal adjec-tives "first," "second," and "third," etc., to describe a common object, merely indicate that different instances of like objects are being referred to and are not intended to imply that the objects so described must be in a given sequence, either temporally, spatially, in ranking or in any other manner.

In the following detailed description, reference is made to the accompanying drawings that form a part hereof, and in which is shown, by way of illustration, embodiments that may be practiced. It is to be understood that other embodi-ments may be utilized, and structural or logical changes may be made without departing from the scope of the present disclosure. Therefore, the following detailed description is not to be taken in a limiting sense.

The accompanying drawings are not necessarily drawn to scale. In the drawings, same reference numerals refer to the same or analogous elements shown so that, unless stated otherwise, explanations of an element with a given reference numeral provided in context of one of the drawings are applicable to other drawings where element with the same reference numerals may be illustrated. Further, the singular and plural forms of the labels may be used with reference numerals to denote a single one and multiple ones respec-tively of the same or analogous type, species, or class of element.

Note that in the figures, various components are shown as aligned, adjacent, or physically proximate merely for ease of illustration; in actuality, some or all of them may be spatially distant from each other. In addition, there may be other components, such as wires, cables, routers, switches, anten-nas, communication devices, etc. in the systems and net-works disclosed that are not shown in the figures to prevent cluttering. Systems and networks described herein may include, in addition to the elements described, other com-ponents and services, including communication interfaces, microprocessors, microcontrollers, network management and access software, connectivity services, routing services, firewall services, content delivery networks, virtual private networks, etc. Further, the figures are intended to show relative arrangements of the components within their sys-tems, and, in general, such systems may include other components that are not illustrated.

In the drawings, a particular number and arrangement of structures and components are presented for illustrative purposes and any desired number or arrangement of such structures and components may be present in various embodiments. Further, unless otherwise specified, the struc-tures shown in the figures may take any suitable form or shape according to various design considerations, manufac-turing processes, and other criteria beyond the scope of the present disclosure.

If a collection of reference numerals designated with different letters are present (e.g., 206A, 206B), such a collection may be referred to herein without the letters (e.g., as "206") and individual ones in the collection may be referred to herein with the letters. Further, labels in upper case in the figures (e.g., 206A) may be written using lower case in the description herein (e.g., 206*a*) and should be construed as referring to the same elements.

Various operations may be described as multiple discrete actions or operations in turn in a manner that is most helpful in understanding the claimed subject matter. However, the order of description should not be construed as to imply that these operations are necessarily order dependent. In particu-lar, these operations may not be performed in the order of presentation. Operations described may be performed in a different order from the described embodiment. Various additional operations may be performed, and/or described operations may be omitted in additional embodiments.

The following foundational information may be viewed as a basis from which the present disclosure may be properly explained. Such information is offered for purposes of explanation only and, accordingly, should not be construed in any way to limit the broad scope of the present disclosure and its potential applications.

Virtual meetings or simply "meetings" are gatherings conducted over the internet using video conferencing technology, allowing participants from different locations to interact in real time. Participants connect remotely via video, and/or audio. The meetings are typically implemented or facilitated through software platforms such as Zoom™, Microsoft Teams™, Google Meet™, Cisco Webex™, etc. Some meetings have a link or meeting credentials, allowing participants to join at a scheduled time. Some virtual meetings are public, meaning anyone with the link or meeting credentials can join; whereas some virtual meetings are private, in that additional access credentials, such as a password, biometric credentials, etc., are needed to access the virtual meeting.

One of the concerns with virtual meetings is the growing menace of deepfakes, i.e., virtual imposters generated by artificial intelligence (AI). Deepfakes can convincingly alter faces, voices, and gestures of individuals in existing footage, creating realistic but fabricated content that can be difficult to distinguish from genuine recordings. Deepfakes utilize AI to blend and superimpose existing images and videos onto source media, altering facial expressions, lip movements, and even voices. They can generate highly realistic simulations of individuals appearing to say or do things they did not, often convincingly mimicking real-life scenarios. Deepfakes can be used to spread false information, mislead viewers, or impersonate individuals in virtual meetings, compromising trust and credibility. Personal data and sensitive information shared in virtual meetings could be manipulated or misused through deepfake technology. Individuals or organizations could face reputational and other harm if deepfakes are used maliciously to create damaging content. The harm to trust, security and integrity is especially acute during virtual meetings within a trusted space, such as a company internal meeting, in which sensitive information such as trade secrets may be discussed in the presence of a deepfake participant whose true identity is unknown.

Currently, combatting deepfake technology is a multi-pronged approach that involves a combination of detection tools, verification (e.g., authentication) tools, policy frameworks, and user education. Detection tools include forensic analysis and AI based solutions. Forensic analysis focuses on algorithms to analyze inconsistencies in facial movements, audio patterns, and other digital artifacts to detect manipulated content. AI and machine learning algorithms can be trained to distinguish between real and manipulated media by examining patterns and anomalies in data. Authentication techniques to overcome deepfakes focus on verifying the authenticity of digital content and detecting manipulated media. These techniques include using biometric data such as facial recognition or voice analysis, digital watermarking to embed verification marks, blockchain for immutable records, AI algorithms for anomaly detection, and implementing two-factor authentication for added security layers. These approaches aim to enhance digital trust and mitigate the risks associated with deepfake technology in media and communications.

Such techniques fall short in applications involving real time generation of deepfakes, such as in virtual meetings, in which one (or more) attendees may, in fact, be deepfake of authorized persons. In other words, the participant in the virtual meeting is actually unauthorized, but may have illegally obtained access credentials of an authorized person and may be impersonating the authorized person using deepfake video and audio of the impersonated person. Some existing verification technologies may identify such deepfake video after the fact with high fidelity, but not in real time. Some multi-factor authentication processes may try to increase authenticity of the access credentials by requiring the user to confirm their identity on a device other than the one they are using to login to the virtual meeting. However, such multi-factor authentication processes can be inconvenient and disrupting to a genuine participant, who may have placed the other device somewhere else, or who may now need to stop their login process, access the other device, obtain the authentication code and then resume their login process into the virtual meeting. Some other authentication processes require the user to use only authenticated (i.e., trusted) devices for participating in the virtual meeting; however, if the authenticated device is not available, or cannot be connected to the network, the user may be unable to participate in the virtual meeting.

Moreover, none of these authentication processes address deepfake scenarios in which the unauthorized participant has obtained access to the virtual meeting by illegal means, circumventing the authentication steps in the first place. For example, the unauthorized participant may have the authenticated device of the impersonated person or may have access to the authentication code received at another device of the impersonated person. An example scenario is a virtual job interview, in which the candidate has given their access credentials in their entirety to a fraudster who now attends the interview on their behalf as a deepfake. The hiring manager handling the interview, who has only previously seen a static photograph of the candidate and perhaps heard their voice on the phone, is not able to judge whether the participant in the virtual interview is the actual candidate or a deepfake.

Accordingly, embodiments of systems and methods for real time deepfake identification in virtual meetings are disclosed herein. An example method executed by an authentication application includes: sending instructions to a device to generate and emit an ultrasonic signal, the device being associated with a user having access credential to a virtual meeting; receiving in real time from the virtual meeting audio data associated with the access credential; searching the audio data for the ultrasonic signal; responsive to finding the ultrasonic signal in the audio data, categorizing the access credential as authentic and allowing the access credential into the virtual meeting; and responsive to not finding the ultrasonic signal in the audio data, categorizing the access credential as unauthentic and rejecting the access credential from the virtual meeting.

In another embodiment, the authentication application may send instructions to a device to generate and emit an infrared key, the device being used to access a virtual meeting by a participant having an access credential; receiving in real time from the virtual meeting visual and infrared data associated with the access credential; searching the visual and infrared data for the infrared key; responsive to finding the infrared key in the visual and infrared data, categorizing the access credential as authentic and allowing the access credential into the virtual meeting; and responsive to not finding the infrared key in the visual and infrared data, categorizing the access credential as unauthentic and rejecting the access credential from the virtual meeting.

In some embodiments, the authentication application may include gatekeeper functionalities, such as sending a notification to access the virtual meeting using other access methods when the authentication via the ultrasonic signal or infrared key fails; sending a notification to a meeting-bot executing inside the meeting application to publish an alert in the virtual meeting, alerting the participants to the presence of an unauthorized participant; sending a report to the virtual meeting to enable a decision whether to terminate the virtual meeting; etc.

Embodiments of the authentication application disclosed herein may enable real time security and authenticity verification to differentiate deepfakes from a real human. The authentication application may be configured to suitably meet enterprise compliance and security standards. The authentication application may execute as a part of the enterprise's security system in some embodiments, using the enterprise's identity verification, authenticated-device management, security policies, etc. to provide a seamless user experience. The authentication application can enable trust by ensuring that participants in the virtual meeting are who they claim to be so that virtual meetings are as good as in-person handshakes.

Example Embodiments

FIG. 1 is a simplified block diagram illustrating a system 100 for real time deepfake identification in virtual meetings according to an example embodiment. An authentication application 102 includes a kernel 104, a meeting-bot 106, a device application 108, application user data 110, and an administrator dashboard 112. Authentication application 102 may interface with an enterprise security management 120, which may include various components, such as mobile device management (MDM) 122, a meeting application 124, an identity and access management (IAM) module 126, a security information and event management (SIEM) 128 and a security module 130. In various embodiments, meeting application 124 may comprise any suitable video conferencing technology that enables a virtual meeting to be conducted in a device, such as a laptop or smartphone.

In various embodiments, each block shown in the drawing may execute in a separate device in some embodiments; in other embodiments, some of the blocks may execute in a common device and others of the blocks may execute in a different device. In various embodiments, authentication application 102, in conjunction with enterprise security management 120 may enable authentication of a participant in a virtual meeting hosted through (or by or in or using) meeting application 124. In various embodiments, authentication application 102 may enable real time identification of deepfakes in the virtual meeting. In the context of the embodiments described herein, "real time" refers to the ability of kernel 104 to process data from the virtual meeting and respond thereto substantially immediately as the processing occurs, without any noticeable delay to an average human user.

Enterprise security management 120 may allow only authenticated-devices, authenticated applications, and authenticated users to access various enterprise resources, such as meeting application 124 or virtual meetings conducted by meeting application 124. Note that as used herein, the term "meeting application" encompasses the virtual meeting that is conducted by the software application; in other words, the operations of meeting application 124 as embodied in the virtual meeting are included in the term "meeting application." Thus, as used herein, access to a virtual meeting implies access to meeting application 124 and vice versa. On the other hand, rejection or denial of access to the virtual meeting or meeting application 124 herein implies inability to participate in, or access, the specific virtual meeting executing in meeting application 124 to which the user has requested access. In some embodiments, rejection or denial of access to the virtual meeting does not imply denial of access to other functionalities of meeting application 124. In other embodiments, rejection or denial of access to the virtual meeting implies denial of access to all functionalities of meeting application 124.

MDM 122 may maintain registrations of authenticated devices through secure access credentials, or security containers in the devices, or such other authentication mechanisms. IAM 126 may maintain registrations of authenticated users through secure access credentials. SIEM 128 may maintain a running list of events and information that pose security concerns to the enterprise. Security module 130 may be used to configure various features of enterprise security management 120. Within such enterprise security management 120, authentication application 102 may comprise an authenticated application (e.g., resource), allowed to access the authenticated devices, communicate with authenticated users and/or verify their access credentials, use enterprise resources such as meeting application 124, and provide reports to SIEM 128 and/or security module 130.

In various embodiments, enterprise users (i.e., humans) may be authorized to access enterprise resources such as meeting application 124 using suitable access credential 132. IAM 126 may manage such enterprise resources and associated access credential 132. Certain devices associated with the enterprise users may also be authenticated based on access credential 132. In some embodiments, access credential 132 for accessing enterprise resources may be same as access credential 132 for authenticating devices; in other embodiments, access credential 132 may be different for enterprise resources and authenticated devices. Access credential 132 may comprise username and password, passkey, face identifier (Face ID), multi-factor authorization, biometric login, and any other type of access credentials without departing from the scope of the embodiments. MDM 122 may authenticate devices appropriately and manage such authenticated-devices and associated access credential 132. MDM 122 and IAM 126 may provide kernel 104 with relevant information associated with enterprise resources, authenticated devices and access credentials of enterprise users.

Device application 108 may be allowed to access the authenticated-device's hardware components, such as ultrasonic transmitters or device speakers, to cause the hardware components to generate and emit ultrasonic signals according to instructions 134a from kernel 104. In some embodiments, device application 108 may also monitor (e.g., listen to, collect, etc.) biometric data 136 recorded or received by the authenticated-device and associated with the human who is authorized to access the enterprise resources. For example, the device may be linked to a wearable monitor that measures, records and transmits biometric data 136 such as heart rate, blood pressure, etc., of the human who is wearing the monitor. Device application 108 may access biometric data 136 based on particular needs, permissions, settings, etc. In some embodiments, device application 108 may be constantly active in the authenticated device; in some other embodiments, device application 108 may be instantiated upon receiving instructions 134a from kernel

104. Device application 108 may require separate access credentials managed by kernel 104 in some embodiments. In other embodiments, access to device application 108 may be managed by IAM 126. In some such embodiments, access to enterprise resources may allow the user access to device application 108 also.

Meeting-bot 106 may be installed in meeting application 124 and/or instantiated when meeting application 124 is opened in system 100. Meeting-bot 106 may monitor meeting application 124 by listening to and collecting data received at meeting application 124. In some embodiments, meeting-bot 106 may access the device on which meeting application 124 is executing and cause the device to emit infrared signals according to instructions 134*b* from kernel 104. Note that meeting application 124 may execute in an authenticated device installed with device application 108 or in any other device without departing from the scope of the embodiments. Meeting-bot 106 may access such device irrespective of the device's authenticated status within enterprise security management 120. Meeting-bot 106 may collect data 138 from meeting application 124, such data 138 including audio data (including audible and inaudible sounds), visual data and infrared data, and send the collected data, timestamped with the time of collection as timestamped data 140, to kernel 104. Kernel 104 may send report 142 to administrator dashboard 112. Report 142 may include data about various risk events, mitigation measures, etc. of relevance to SIEM 128 and security module 130. In some embodiments, kernel 104 may communicate with meeting application 124 directly, for example, to push notifications or reports based on particular needs.

During operation, in an example embodiment, when a user accesses meeting application 124 using access credential 132, kernel 104 may query its internal database and find the authenticated device that is linked to access credential 132. Kernel 104 may thereafter determine the address of device application 108 installed on the authenticated device. Kernel 104 may generate a cryptographic key and instructions 134*a* to generate an ultrasonic signal encoding the cryptographic key. In some embodiments, the cryptographic key is a random number. Kernel 104 may send instructions 134*a* to device application 108 at the address; instructions 134*a* enable the authenticated device to generate and emit the ultrasonic signal. If the authenticated-device is close to the user, the ultrasonic signal is mixed with audible signals from the user or the user's environment and picked up by the user's microphone to appear in data 138 collected by meeting-bot 106. Meeting-bot 106 may collect data 138, tag it with the access credentials of the participant, timestamp the time of collection, and send timestamped data 140 to kernel 104. Kernel 104 may identify the ultrasonic signal in the audio data, extract the cryptographic key therefrom, compare it to the previously generated cryptographic key and authenticate the user as a human when there is a match.

A match may not be found under one of two scenarios: (1) the authenticated device is not proximate to the microphone associated with meeting application 124; and (2) the audio data from the microphone is manipulated before being sent to meeting application 124. In the event that a match is not found, kernel 104 may push alerts and/or notifications to be published in meeting application 124 or sent to the user by other means, such as through texts, emails, etc. The notifications may address the first scenario in which an authorized user has forgotten to bring the authenticated device to the virtual meeting or has inadvertently placed the device far away from the virtual meeting. The notification may alert the user of the lapse and alternate options to access meeting application 124 may be used.

However, where the user is unauthorized and does not have the authenticated device, the inability to access meeting application 124 after the notification may indicate a deepfake situation. Likewise, the second scenario in which the audio data is manipulated is likely to be a deepfake. In either of these cases, a simple notification is unlikely to resolve the issue. Thus, the lack of a match followed by delay in accessing meeting application 124 or inability to log into meeting application 124 may enable identification of the deepfake with a high degree of confidence. In such cases, kernel 104 may flag access credential 132 as compromised in enterprise security management 120. The flag may trigger various actions according to security policies set by IAM 126. For example, the user may be denied access to meeting application 124; or meeting application 124 may be terminated. Various other security measures may be undertaken without departing from the scope of the embodiments.

In some embodiments, kernel 104 may periodically send instructions 134*a* to device application 108 to generate the ultrasonic signal according to a predetermined schedule. The cryptographic key encoded by the ultrasonic signal may be different in each repetition. Kernel 104 may identify the ultrasonic signal from timestamped data 140 subsequently, extract the cryptographic key therefrom, and correlate with instructions 134*a* at the corresponding timestamp, thereby confirming that the authenticated human is continuing to participate in meeting application 124. In various embodiments, kernel 104 may send reports 142 to administrator dashboard 112 and/or meeting application 124 via meeting-bot 106 according to a predetermined schedule or upon request.

In some embodiments, when the user accesses meeting application 124 using access credential 132, kernel 104 may generate a cryptographic key and instructions 134*b* to generate an infrared signal encoding the cryptographic key. Kernel 104 may send instructions 134*b* to meeting-bot 106 to generate and emit the infrared signal. The infrared signal may reflect off the user or the user's surrounding and be picked up in electromagnetic signals captured by a camera having optical and infrared sensors. The collected electromagnetic signals may appear in data 138 collected by meeting-bot 106. Meeting-bot 106 may tag data 138 with the access credentials of the user, timestamp the time of collection, and send timestamped data 140 to kernel 104. Kernel 104 may identify the infrared signal in data 138, extract the cryptographic key therefrom, compare it to the previously generated cryptographic key and authenticate the user as a human when there is a match. A match may not be found where the video data from the camera is manipulated before being sent to meeting application 124, such as in deepfake scenarios. In the event that a match is not found, actions as described previously in reference to the lack of a match with ultrasonic signals may be implemented in system 100.

In some embodiments, kernel 104 may periodically send instructions 134*b* to meeting-bot 106 to generate the infrared signal according to a predetermined schedule. The cryptographic key encoded by the infrared signal may be different in each repetition. Kernel 104 may identify the infrared signal from timestamped data 140 subsequently, extract the cryptographic key therefrom, and correlate with instructions 134*a* at the corresponding timestamp, thereby confirming that the authenticated human is continuing to participate in meeting application 124.

Note that in some scenarios, irrespective of whether ultrasonic signals or infrared signals are used to encode the cryptographic key, the lack of a match may be sufficient to categorize the participant as not trusted; a greater degree of confidence with additional notification or security measures may not be needed. Such may be the case, for example, in a job interview, where there is a low trust score to begin with, for example, because the user is not fully vetted by enterprise security management 120 yet; the hiring manager is not familiar with the interviewee; etc. In such a scenario, a non-zero likelihood of deepfake based on the lack of match is sufficient to warrant terminating the interview. On the other hand, in situations where the trust score is high, such as between an employer and an employee, it may be desired to augment the likelihood of deepfake with even greater confidence by additional authentication means. Security policies set by IAM 126 may be used to address such situations where additional security measures are needed to confirm with a higher degree of certainty that the user is a deepfake.

Figure 2A:
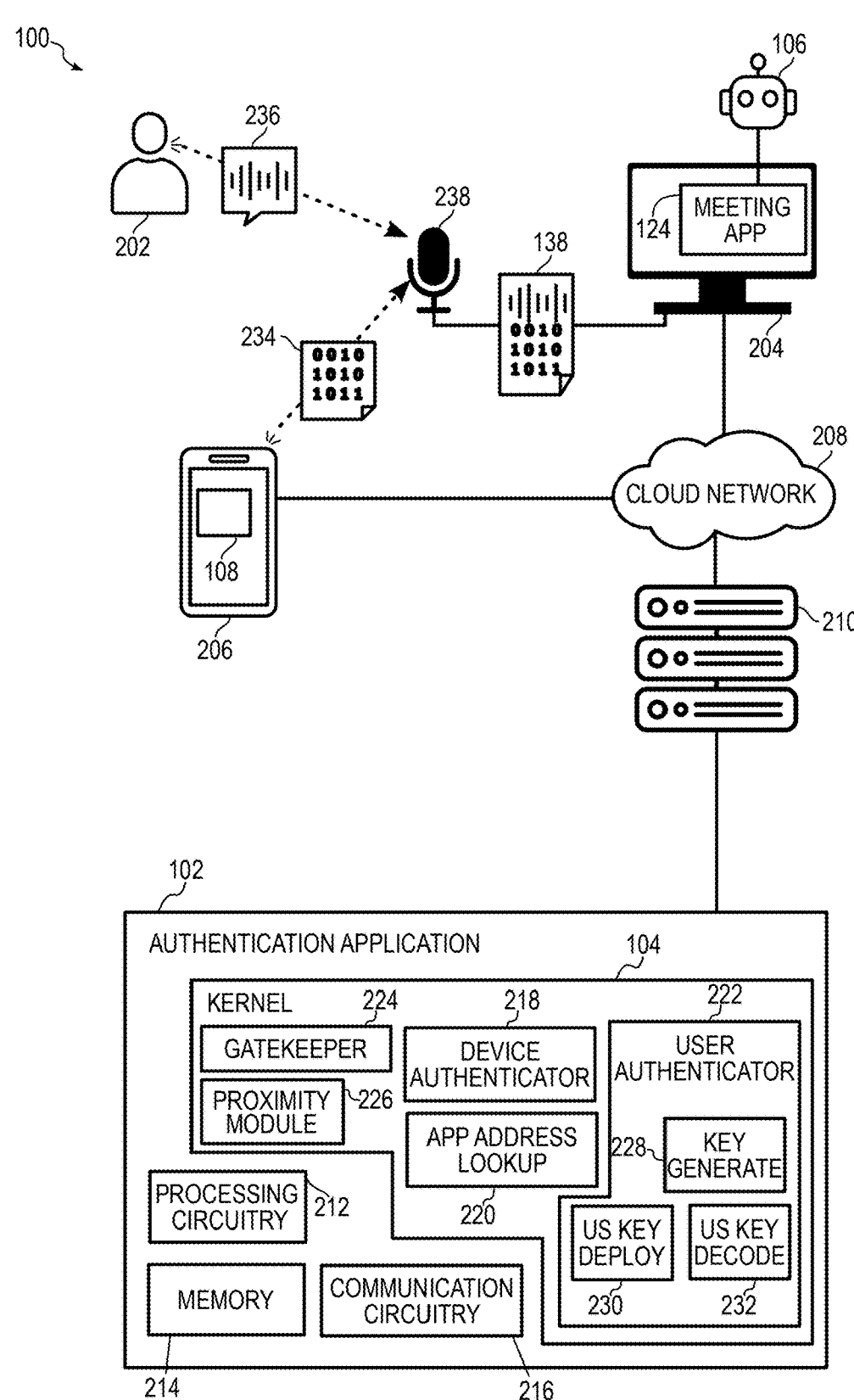
FIGS. 2A-2B are simplified diagrams illustrating various details of the system of FIG. 1, according to an example embodiment.
Figure 2B:
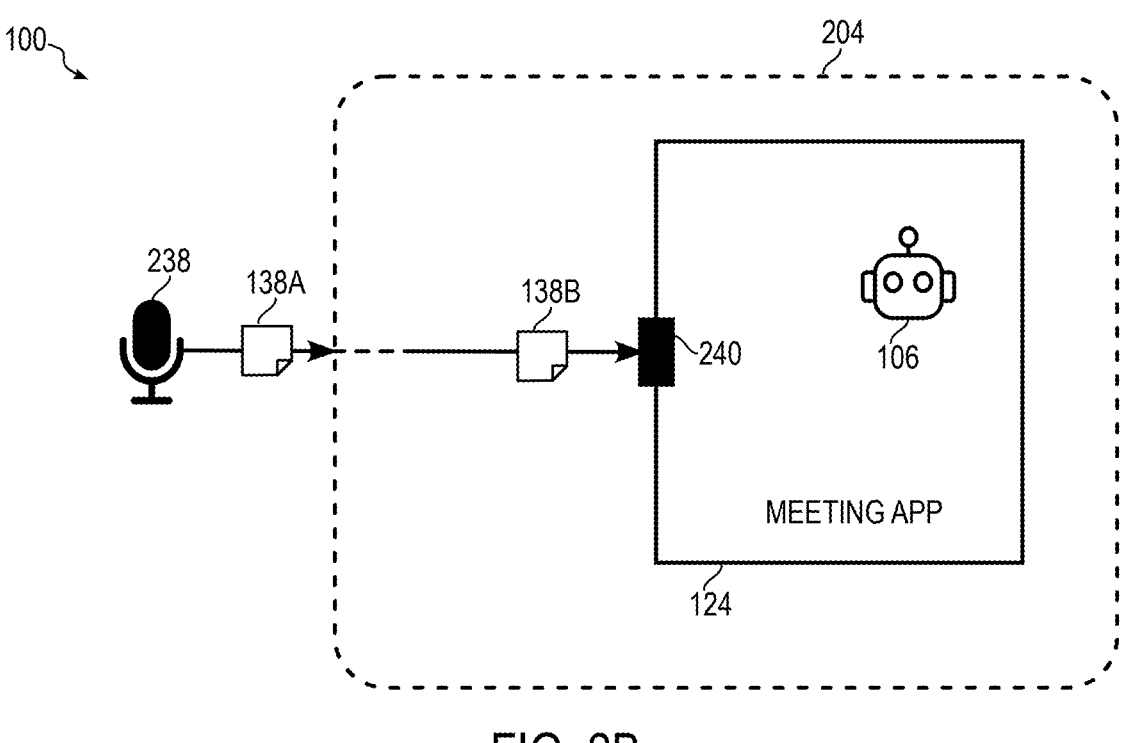

FIGS. 2A-2B are simplified diagrams illustrating various details of system 100 according to an example embodiment. As shown in FIG. 2A, a user 202 may desire to access meeting application 124 executing in device 204. User 202 refers to a human participant in authentic cases. In deepfake scenarios, user 202 may be software imitating the human participant. User 202 may be associated with a trusted-device 206 in which device application 108 is installed. In the example shown, trusted-device 206 in which device application 108 executes is different from device 204 in which meeting application 124 executes. In other examples, device 204 and trusted-device 206 may be the same; i.e., device application 108 and meeting application 124 may be installed and/or execute in the same device (e.g., device 204 or trusted-device 206). In examples where device 204 and trusted-device 206 are different, device 204 may or may not be authenticated or otherwise associated with user 202 within the broad scope of the embodiments.

Note that trusted-device 206 may be authenticated and managed by MDM 122 within enterprise security management 120. In some embodiments, meeting application 124 is installed only in such authenticated devices. In some other embodiments, any device in which device application 108 is installed may be trusted, because device application 108 allows control of certain functionalities and hardware components of the device by authentication application 102 within the scope of the embodiments described herein. Device 204 may be, but need not be, authenticated by MDM 122 within the broad scope of the embodiments herein. Different labels are given to devices 204 and 206 herein merely for ease of explanation and not as a limitation.

Device 204 and trusted-device 206 may be coupled to authentication application 102 over a cloud network 208. In various embodiments, authentication application 102 may be implemented in one or more servers 210 in cloud network 208. Certain portions of authentication application 102 may execute using a processing circuitry 212, a memory 214 and communication circuitry 216 (among other components) in one or more servers 210. In some embodiments, one or more of the features of authentication application 102 may be implemented in hardware, provided external to these elements, or consolidated in any appropriate manner to achieve the intended functionality. The various network elements in system 100 may include communication software that can coordinate to achieve the operations as outlined herein. In still other embodiments, these elements may include any suitable algorithms, hardware, software, components, modules, interfaces, or objects that facilitate the operations thereof.

Processing circuitry 212 may execute any type of instructions associated with data stored in memory 214 to achieve the operations detailed herein. In one example, processing circuitry 212 may transform data from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., field programmable gate array (FPGA), an erasable programmable read only memory (EPROM), an application specific integrated circuit (ASIC)) that includes digital logic, software, code, electronic instructions, flash memory, optical disks, magnetic or optical cards, other types of machine-readable mediums suitable for storing electronic instructions, or any suitable combination thereof.

In some of example embodiments, one or more memory 214 may store data used for the operations described herein. This includes memory 214 storing instructions (e.g., software, logic, code, etc.) in non-transitory tangible media (e.g., random access memory (RAM), read only memory (ROM), FPGA, EPROM, etc.) such that the instructions are executed to carry out the activities described in this disclosure based on particular needs. In some embodiments, memory 214 may comprise non-transitory computer-readable tangible media, including one or more memory devices such as volatile memory such as dynamic RAM (DRAM), nonvolatile memory (e.g., ROM), flash memory, solid-state memory, and/or a hard drive. In some embodiments, memory 214 may share a die with processing circuitry 212. Memory 214 may include algorithms, code, software modules, and applications, which may be executed by processing circuitry 212. The data being tracked, sent, received, or stored in system 100 may be provided in any database, register, table, cache, queue, control list, or storage structure, based on particular needs and implementations, all of which could be referenced in any suitable timeframe.

Communication circuitry 216 may be configured for managing wired or wireless communications for the transfer of data in system 100. The term "wireless" and its derivatives may be used to describe circuits, devices, systems, methods, techniques, communications channels, etc., that may communicate data through modulated electromagnetic radiation in a nonsolid medium. The term does not imply that the associated devices do not contain any wires, although in some embodiments they might not. Communication circuitry 216 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long Term Evolution (LTE) project along with any amendments, updates, and/or revisions (e.g., advanced LTE project, ultramobile broadband (UMB) project (also referred to as "3GPP2"), etc.). Communication circuitry 216 may operate in accordance with a Global System for Mobile Communication (GSM), General Packet Radio Service (GPRS), Universal Mobile Telecommunications System (UMTS), High-Speed Packet Access (HSPA), Evolved HSPA (E-HSPA), or LTE network. Communication circuitry 216 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). Communication circuitry 216 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. Communication circuitry 216 may operate in accordance with other wireless protocols in other embodiments. Communication circuitry 216 may include antennas to facilitate wireless communications and/or to receive other wireless communications.

In some embodiments, communication circuitry 216 may manage wired communications, such as electrical, optical, or any other suitable communication protocols (e.g., the Ethernet, Internet). Communication circuitry 216 may include multiple communication chips. For instance, a first communication chip may be dedicated to shorter-range wireless communications such as Wi-Fi or Bluetooth, and a second communication chip may be dedicated to longer-range wireless communications such as global positioning system (GPS), EDGE, GPRS, CDMA, WiMAX, LTE, EV-DO, or others. In some embodiments, a first communication chip may be dedicated to wireless communications, and a second communication chip may be dedicated to wired communications.

The example network environment may be configured over a physical infrastructure that may include one or more networks and, further, may be configured in any form including, but not limited to, local area networks (LANs), wireless local area networks (WLANs), virtual local area networks (VLANs), metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a WANs (e.g., the Internet).

In various embodiments, kernel 104 may include a device authenticator 218; an application address-lookup module 220; a user authenticator 222; a gatekeeper 224; and a proximity module 226. User authenticator 222 may include a key-generate module 228; an ultrasonic-key-deploy module 230; and an ultrasonic-key-decode module 232. Device authenticator 218 may find trusted-device 206 that is linked to access credential 132 of user 202. Application-address-lookup module 220 may thereafter determine the address of device application 108 installed in trusted-device 206. Key-generate module 228 may generate a cryptographic key. The cryptographic key may comprise a random number in some embodiments. In other embodiments, the cryptographic key may be a fixed-size output generated by a hash function. Various other types of cryptographic keys may be used within the broad scope of the embodiments.

Ultrasonic-key-deploy module 230 may create instructions 134a (not shown to prevent clutter) to cause trusted-device 206 to generate an ultrasonic signal 234 encoding the cryptographic key. Ultrasonic signal 234 may comprise discrete or continuous time-varying ultrasonic sound waves at one or more frequencies that corresponds to the cryptographic key. For example, ultrasonic signal 234 may comprise a sequence of sound pulses at two different frequencies, each frequency corresponding to either 0 or 1. Various other mechanisms to encode the cryptographic key using ultrasonic signals may be included within the broad scope of the embodiments.

Ultrasonic-key-deploy module 230 may send instructions 134a to device application 108. Instructions 134a may cause trusted-device 206 to generate and emit ultrasonic signal 234. User 202 and/or the ambient environment around user 202 may generate one or more audible signal 236. Audible signal 236 comprises sound waves at frequencies audible to the human ear. If trusted-device 206 is close to user 202, ultrasonic signal 234 may mix with audible signal 236 and be picked up by a microphone 238 associated with meeting application 124 executing in device 204. Microphone 238 may send the collected signals as data 138 to meeting application 124.

Microphone 238 is shown as separate from device 204 merely for ease of explanation. In various embodiments, microphone 238 may be integrated into device 204 (e.g., contained within a housing, envelope, or chassis thereof), or included in a stand-alone equipment connected to device 204, for example, wirelessly (e.g., Bluetooth, Wireless-Fidelity (WiFi), etc.) or by wires. Microphone 238 may be a dedicated equipment (e.g., having a single main functionality, such as a listening functionality) or may be integrated with or within equipment that has other functionalities (e.g., equipment having microphone and camera integrated together). Microphone 238 described in the various embodiments herein may be integrated with or within any equipment suitably based on particular needs even when the manner of such integration is not mentioned with specificity.

Note that meeting application 124 may receive audible signal 236 and ultrasonic signal 234 from multiple users 202 who have accessed meeting application 124 using separate access credentials. In some embodiments, meeting-bot 106 may tag data 138 with access credential 132 of associated user 202 using capabilities of meeting application 124 suitably to identify the source of specific data 138. For example, as shown in FIG. 2B, meeting application 124 may dynamically assign a port 240 to access credential 132 of user 202. Port 240 may receive audio streams from user 202. Any data 138 arriving at meeting application 124 on assigned port 240 may thus be associated with access credential 132 suitably. In some embodiments, data 138 may comprise two components 138a and 138b that are the same in authentic scenarios and different in deepfake scenarios. For example, data 138a may be sent by microphone 238 to device 204. Within device 204, data 138a may be manipulated by deepfake algorithms or other software and provided as data 138b to port 240. Thus, data 138 received by meeting-bot 106 associated with user 202 in this latter scenario is data 138b and not data 138a.

Turning back to FIG. 2A, note that various other means of associating data 138 with access credential 132 of user 202 may be used by meeting-bot 106 without departing from the scope of the embodiments. In various embodiments, meeting-bot 106 may aggregate data 138 from substantially all users 202 who have accessed meeting application 124 with respective access credential 132; the aggregated data 138 may comprise separate subsets tagged respectively according to access credential 132 of corresponding users 202.

Meeting-bot 106 may timestamp data 138 and send time-stamped data 140 (not shown to prevent clutter) to authentication application 102 over cloud network 208. Ultrasonic-key-decode module 232 may disaggregate the received data, separating individual sets according to respective tagged access credential 132. Ultrasonic-key-decode module 232 may extract the cryptographic key encoded in ultrasonic signal 234 from the relevant subset of timestamped data 140 and compare with the cryptographic key previously generated by key-generate module 228 for that access credential 132. If there is a match, gatekeeper 224 may allow user 202 access to meeting application 124. If there is no match, either because ultrasonic signal 234 was not present in timestamped data 140 or ultrasonic signal 234 in timestamped data 140 did not encode the previously generated cryptographic key, user 202 may be classified as unauthenticated and further security actions may be taken by gatekeeper 224, such as denying access to meeting application 124. Ultrasonic-key-decode module 232 may repeat the operations for each access credential 132.

In some embodiments, proximity module 226 may determine the proximity of trusted-device 206 and/or user 202 to device application 108 based on the time delays and other meta information gathered in data 138. Such analysis can contribute to a trust score or confidence level of any decision made by gatekeeper 224. In some embodiments, the virtual meetings may be desired to be conducted in certain known or authorized locations. For example, such locations may be a home office, a conference room in a company, an office in a designated building, etc. Such locations may be deemed "safe" by IAM 126 and learnt using appropriate AI techniques, for example, from pretraining on the reflected ultrasonic signals extracted from these locations. In some such embodiments, data 138 may include reflections in the ultrasonic range from walls and objects surrounding user 202. In addition to decoding the cryptographic key in ultrasonic signal 234, ultrasonic-key-decode module 232 may decode information in the ultrasonic portion of data 138 to decipher the surroundings based on the pretraining. Accordingly, the surroundings may be classified as "safe" if a match is found and "unsafe" if a match is not found. A finding of a safe location may provide further confirmation about the authenticity of user 202. Likewise, a finding of an unsafe location may serve to decrease the authenticity of user 202 unless other security measures are undertaken. In some embodiments, an aggregated trust score based on decoding and matching the cryptographic key and the surroundings may be used to determine the authenticity of user 202.

Note that various modules are shown in the figure but are not labeled as modules merely for ease of illustration and to prevent clutter, and not as a limitation. Also, some words are shown in the figure is shortened form (e.g., "app" for "application", "US" for "ultrasonic") or without hyphens merely to prevent clutter.

Figure 3A:
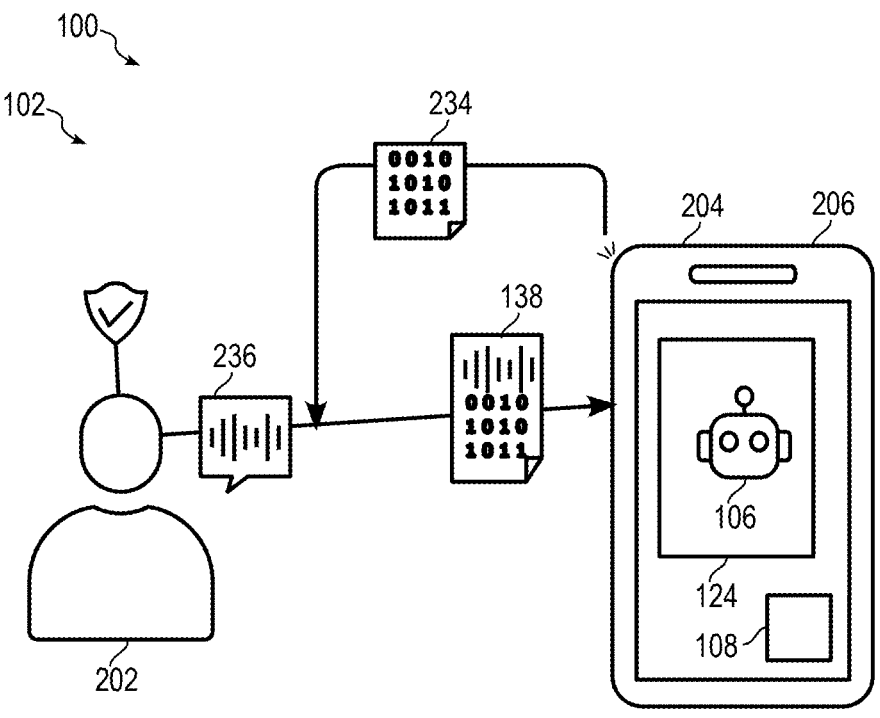
FIGS. 3A-3C are simplified diagrams illustrating example details of the system of FIG. 2A, according to various embodiments.
Figure 3B:
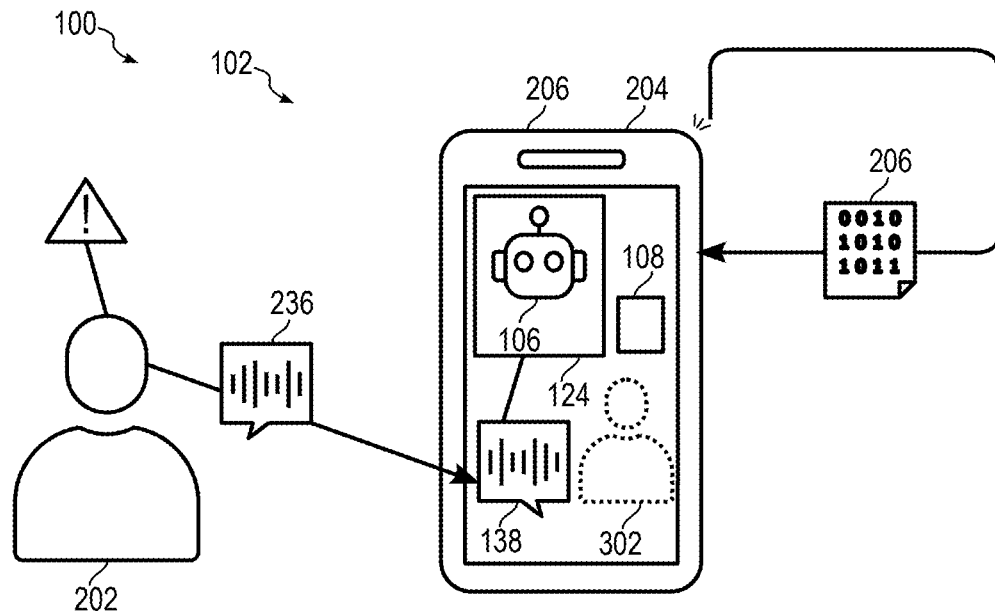
Figure 3C:
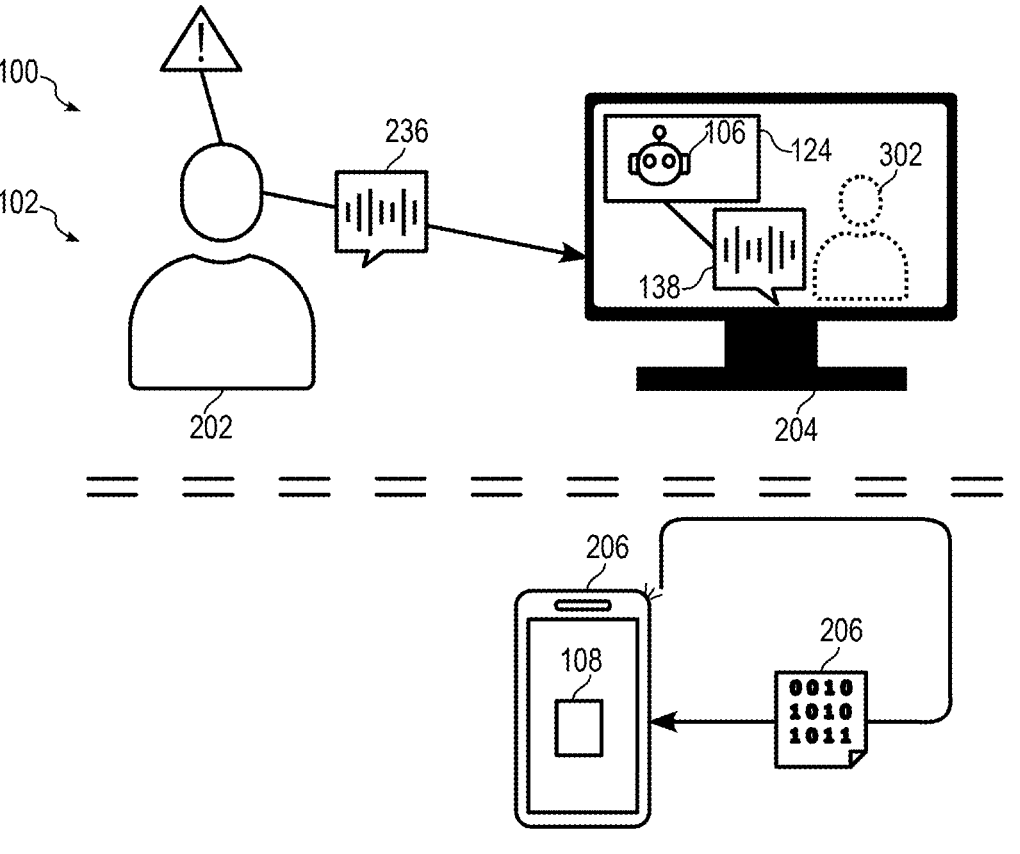

FIGS. 3A-3C are simplified diagrams illustrating example operational details in system 100 according to some embodiments. FIG. 3A shows a scenario in which user 202 is identified as a human participant in meeting application 124 and consequently authenticated and allowed to access meeting application 124. In the example shown, device 204 and trusted-device 206 are the same physical device in which device application 108 and meeting application 124 are installed. Assume that user 202 accesses meeting application 124. As described in reference to other figures, device application 108 may cause trusted-device 206 to generate and emit ultrasonic signal 234. Ultrasonic signal 234 may merge with audible signal 236 from user 202 or the ambient environment around user 202 into data 138, which is captured by meeting-bot 106. The presence of the correct ultrasonic signal 234 and audible signal 236 in data 138 may indicate with a high degree of confidence that audible signal 236 is from a real human being, or least from an audio source outside device 204. If higher level of confidence is required that user 202 is authentic, voice recognition software and such other authentication means may be additionally used to improve confidence.

FIG. 3B shows another scenario in which user 202 is identified as a deepfake in meeting application 124 and consequently rejected from meeting application 124. In the example shown, device 204 and trusted-device 206 are the same physical device in which device application 108 and meeting application 124 are installed. Assume that user 202 accesses meeting application 124. As described in reference to other figures, device application 108 may cause trusted-device 206 to generate and emit ultrasonic signal 234. Ultrasonic signal 234 may merge with audible signal 236 from user 202 or the ambient environment around user 202. However, unlike the scenario described in reference to FIG. 3A, a deepfake algorithm 302 may process data 138 received at device 204 and provide the processed version of data 138 to meeting application 124. During such processing, ultrasonic signal 234 is corrupted or lost, and data 138 that is captured by meeting-bot 106 may not include ultrasonic signal 234, indicating with a high degree of confidence that user 202 is not authentic.

FIG. 3C shows yet another scenario in which user 202 is identified as unauthorized in meeting application 124 and consequently rejected from meeting application 124. In the example shown, device 204, in which meeting application 124 executes, is different from trusted-device 206 in which device application 108 executes. Assume also that trusted-device 206 is located far from device 204 so that any audio signal from trusted-device 206 cannot be captured or received at device 204. Such a scenario is likely in cases where an unauthorized person who does not have trusted-device 206 attempts to access meeting application 124.

As described in reference to other figures, device application 108 may cause trusted-device 206 to generate and emit ultrasonic signal 234. Because trusted-device 206 is not proximate to device 204, ultrasonic signal 234 will not be picked up by meeting-bot 106 executing in device 204. Further, audible signal 236 generated by user 202 may be manipulated by deepfake algorithm 302 into data 138, which is captured by meeting-bot 106. Data 138 in such a scenario will not have ultrasonic signal 234 because device 204 and trusted-device 206 are not proximate to each other. The absence of ultrasonic signal 234 in data 138 may indicate that user 202 is not authentic. Note that it is not necessary for audible signal 236 to be manipulated by deepfake algorithm 302 for a determination that user 202 is not authentic because even unprocessed audible signals in the vicinity of device 204 will not include ultrasonic signal 234 due to the distance between trusted-device 206 and device 204.

Figure 4:
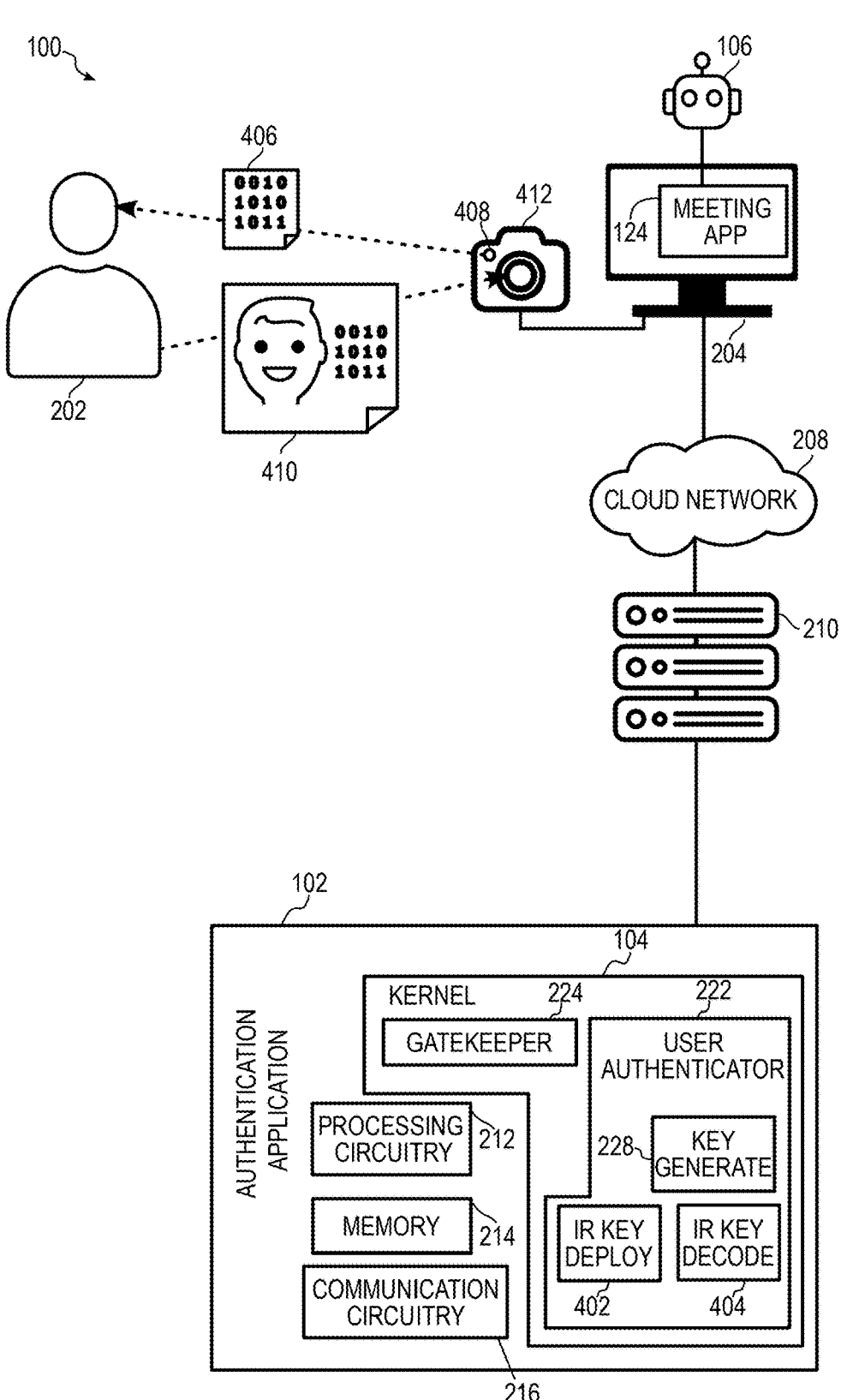
FIG. 4 is a simplified diagram illustrating various details of the system for real time deepfake identification in virtual meetings, according to an example embodiment.

FIG. 4 is a simplified diagram illustrating various details of system 100 according to an example embodiment. User 202 may desire to access meeting application 124 executing in device 204. Device 204 may be coupled to authentication application 102 over cloud network 208. In various embodiments, authentication application 102 may be implemented in one or more servers 210 in cloud network 208. Certain portions of authentication application 102 may execute using processing circuitry 212, memory 214 and communication circuitry 216 (among other components) in the one or more servers 210 as described previously in reference to FIG. 2A.

In various embodiments, kernel 104 may include user authenticator 222 and gatekeeper 224. User authenticator 222 may include key-generate module 228; an infrared key-deploy module 402; and an infrared key-decode module 404. Key-generate module 228 may generate a cryptographic key. In some embodiments, the cryptographic key comprises a random number. Infrared key-deploy module 402 may create instructions 134b (not shown to prevent clutter) to cause device 204 to generate an infrared signal 406 encoding the cryptographic key. Infrared signal 406 may comprise discrete or continuous time-varying infrared waves at one or more frequencies that corresponds to the cryptographic key. For example, infrared signal 406 may comprise a sequence of electromagnetic pulses at two different frequencies in the infrared frequency range, each frequency corresponding to either 0 or 1. Various other mechanisms to encode the cryptographic key using infrared signals may be included within the broad scope of the embodiments.

Infrared key-deploy module 402 may send instructions 134b to meeting-bot 106. Meeting-bot 106 may access an infrared source 408 associated with device 204 and cause it to generate and emit infrared signal 406. Infrared signal 406 may reflect off user 202, and the total image including that of user 202 and/or the ambient environment around user 202 and infrared signal 406 may be collected in one or more electromagnetic signal 410 in the visual and infrared range. Electromagnetic signal 410 may be picked up by optical and infrared sensors in camera 412 associated with meeting application 124 executing in device 204. Electromagnetic signal 410 containing therein infrared signal 406 may comprise data 138 (not shown to prevent clutter) collected by meeting-bot 106.

Infrared source 408 is shown integrated with camera 412 merely for ease of explanation. Likewise, camera 412 is shown as separate from device 204 merely for ease of explanation. In various embodiments, infrared source 408 and/or camera 412 may be integrated into device 204 (e.g., contained within a housing, envelope, or chassis thereof), or included in a stand-alone equipment connected to device 204, for example, wirelessly (e.g., Bluetooth, Wireless-Fidelity (WiFi), etc.) or by wires. Infrared source 408 and/or camera 412 may be a dedicated equipment (e.g., having a single main functionality, such as emitting infrared signals only; or camera functionality only; etc.) or may be integrated with or within equipment that has other functionalities (e.g., equipment having microphone and camera integrated together). Infrared source 408 and camera 412 described in the various embodiments herein may be integrated with or within any equipment suitably based on particular needs even when the manner of such integration is not mentioned with specificity.

Note that meeting application 124 may receive multiple electromagnetic signals 410 from different users 202 who have accessed meeting application 124 using separate access credentials. In some embodiments, meeting-bot 106 may tag data 138 with access credential 132 of associated user 202 using capabilities of meeting application 124 suitably to identify the source of specific data 138. For example, when user 202 joins the virtual meeting, meeting application 124 may dynamically assign a port for the video streams from user 202, similar to port 240 for audio streams. In some embodiments, port 240 may be used for audio and video streams; in other embodiments, separate ports may be provided for audio and video streams. Any data 138 arriving at meeting application 124 on the assigned port may thus be associated with access credential 132 suitably. Various other means of associating data 138 with access credential 132 of user 202 may be used by meeting-bot 106 without departing from the scope of the embodiments. In various embodiments, meeting-bot 106 may aggregate data 138 from substantially all users 202 who have accessed meeting application 124 with respective access credential 132; the aggregated data 138 may comprise separate subsets tagged respectively according to access credential 132 of corresponding users 202.

Meeting-bot 106 may timestamp data 138 and send timestamped data 140 (not shown to prevent clutter) to authentication application 102 over cloud network 208. Infrared key-decode module 404 may extract the cryptographic key encoded in electromagnetic signal 410 from timestamped data 140 and compare with the random number previously generated by key-generate module 228. If there is a match, gatekeeper 224 may allow user 202 access to meeting application 124. If there is no match, either because infrared signal 406 was not present in timestamped data 140 or infrared signal 406 in timestamped data 140 did not encode the previously generated cryptographic key, user 202 may be classified as unauthenticated and further security actions may be taken by gatekeeper 224, such as denying access to meeting application 124.

In some embodiments, electromagnetic signal 410 may include additional infrared information than what is provided in the cryptographic key encoded in infrared signal 406. Such additional infrared information may include, by way of example and not as a limitation, a body heat map of the person in front of camera 412. The body heat map may indicate a human being. A doll or other inanimate object that is being spoofed as a human using software means, would not generate the expected body heat and would raise a red flag. Infrared key-decode module 404 may be provisioned with appropriate algorithms to check for, interpret, and categorize such additional infrared information from data 138.

In some embodiments, the virtual meetings may be desired to be conducted in certain safe locations. Such locations may be learnt using appropriate AI techniques, for example, from pretraining on reflected infrared signals at these locations. In some such embodiments, electromagnetic signal 410 may include reflections in the infrared range from walls and objects surrounding user 202. In addition to decoding the cryptographic key in infrared signal 406, infrared key-decode module 404 may decode information in the infrared portion of electromagnetic signal 410 to decipher the surroundings based on the pretraining. Accordingly, the surroundings may be classified as "safe" if a match is found and "unsafe" if a match is not found. A finding of a safe location may provide further confirmation about the authenticity of user 202. Likewise, a finding of an unsafe location may serve to decrease the authenticity of user 202 unless other security measures are undertaken. In some embodiments, an aggregated trust score based on decoding and matching the cryptographic key, the surroundings, and the infrared heat map may be used to determine the authenticity of user 202.

Note that various modules are shown in the figure but are not labeled as modules merely for ease of illustration and to prevent clutter and not as a limitation. Also, some words are shown in the figure is shortened form (e.g., "app" for "application", "IR" for "infrared") merely to prevent cluttering.

Figure 5A:
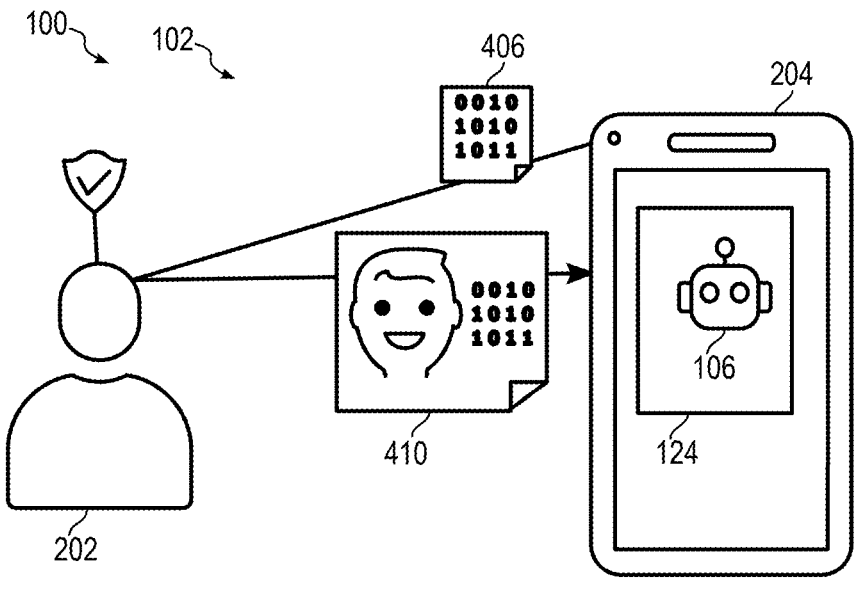
FIGS. 5A-5B are simplified diagrams illustrating example details of the system of FIG. 4, according to various embodiments.
Figure 5B:
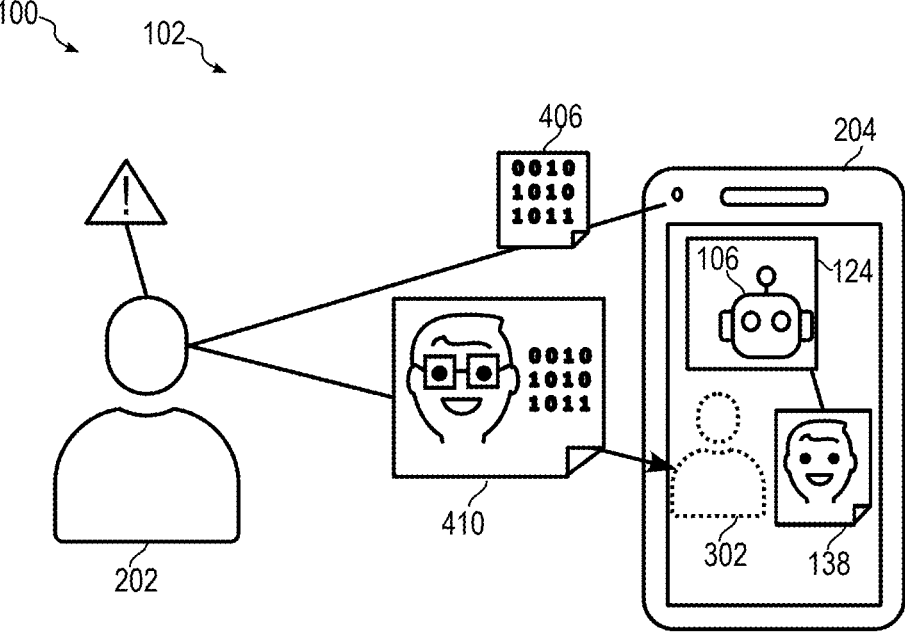

FIGS. 5A-5B are simplified diagrams illustrating example operational details in system 100 according to some embodiments. FIG. 5A shows a scenario in which user 202 is identified as a human participant in meeting application 124 and consequently authenticated and allowed to access meeting application 124. Assume that user 202 accesses meeting application 124. As described in reference to other figures, meeting-bot 106 may cause infrared source 408 (not shown for ease of illustration) in device 204 to generate and emit infrared signal 406. Infrared signal 406 may be reflected off user 202 and/or surroundings and be sensed as electromagnetic signal 410 by camera 412 (not shown for ease of illustration). Electromagnetic signal 410 may be captured as data 138 by meeting-bot 106 in meeting application 124. The presence of the correct infrared signal 406 in data 138 may indicate with a high degree of confidence that electromagnetic signal 410 is from a real human being. If a higher level of confidence is required that user 202 is authentic, image recognition software and such other authentication means may be additionally used to improve confidence.

FIG. 5B shows another scenario in which user 202 is identified as a deepfake in meeting application 124 and consequently rejected from meeting application 124. Assume that user 202 accesses meeting application 124. As described in reference to other figures, meeting-bot 106 may cause infrared source 408 (not shown for ease of illustration) in device 204 to generate and emit infrared signal 406. Infrared signal 406 may be reflected off user 202 and/or surroundings and be sensed as electromagnetic signal 410 by camera 412 (not shown for ease of illustration). However, unlike the scenario described in reference to FIG. 5A, deepfake algorithm 302 may process electromagnetic signal 410 and provide the processed version as data 138 to meeting application 124. During such processing, infrared signal 406 is corrupted or lost, and data 138 that is captured by meeting-bot 106 may not include infrared signal 406, indicating with a high degree of confidence that user 202 is not authentic.

Figure 6:
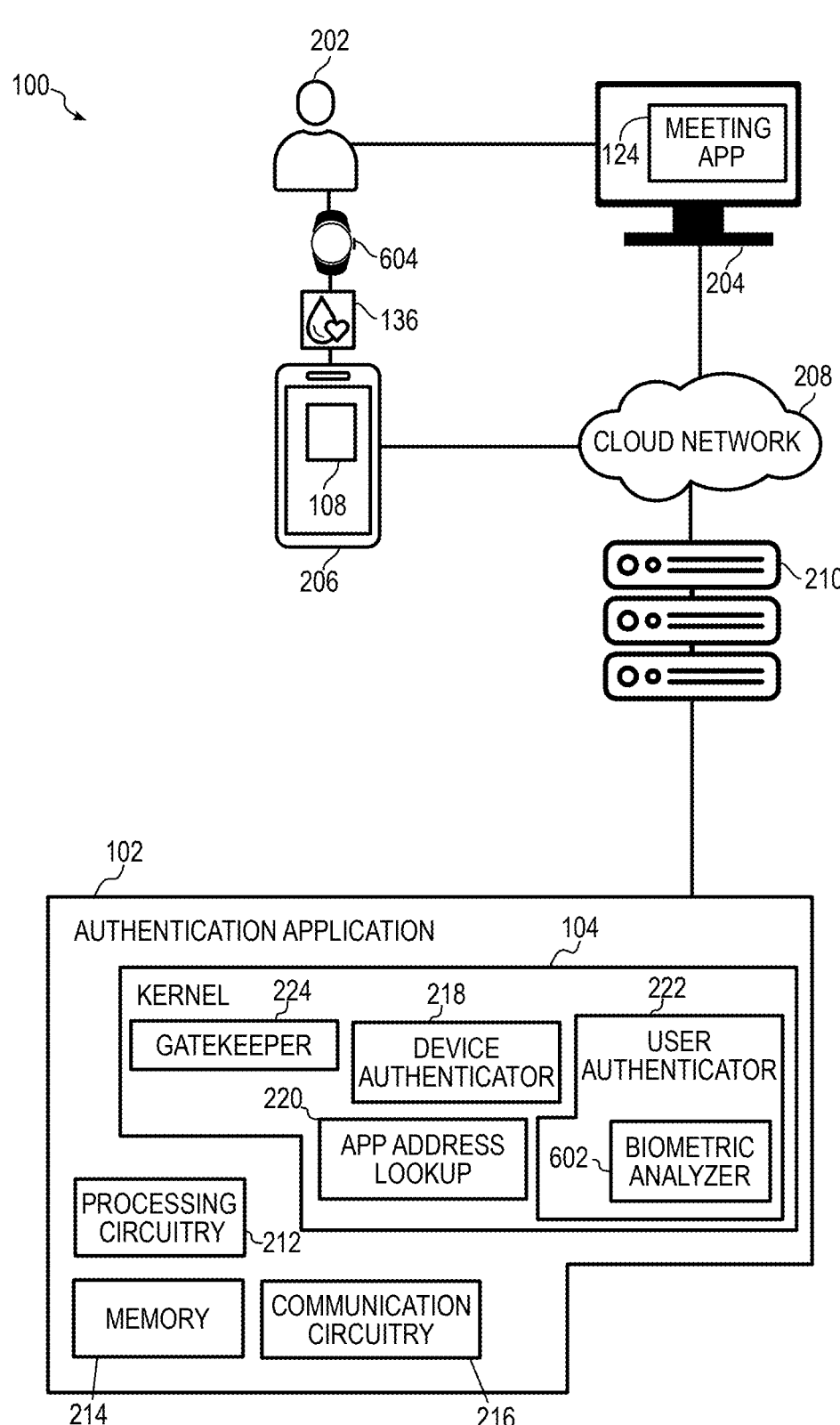
FIG. 6 is a simplified diagram illustrating various example details of the system for real time deepfake identification in virtual meetings, according to some embodiments.

FIG. 6 is a simplified diagram illustrating various details of system 100 according to an example embodiment. User 202 may desire to access meeting application 124 executing in device 204. User 202 may be associated with trusted-device 206, in which device application 108 is installed. In the example shown, trusted-device 206, in which device application 108 is installed, is different from device 204, in which meeting application 124 is installed. In other examples, device 204 and trusted-device 206 may be the same; i.e., device application 108 and meeting application 124 may be installed in the same device (e.g., device 204 or trusted-device 206). In examples where device 204 and trusted-device 206 are different, device 204 may or may not be authenticated or otherwise associated with user 202 within the broad scope of the embodiments. Device 204 and trusted-device 206 may be coupled to authentication application 102 over cloud network 208. In various embodiments, authentication application 102 may be implemented in one or more servers 210 in cloud network 208. Certain portions of authentication application 102 may execute using processing circuitry 212, memory 214 and communication circuitry 216 (among other components) in the one or more servers 210 as described previously in reference to FIG. 2A.

In various embodiments, kernel 104 may include device authenticator 218; application address-lookup module 220; user authenticator 222; and gatekeeper 224. User authenticator 222 may include biometric analyzer 602. In various embodiments, user 202 may attempt to access meeting application 124 using access credential 132. Device authenticator 218 may find trusted-device 206 linked to access credential 132 of user 202. Application address-lookup module 220 may thereafter determine the address of device application 108 installed on trusted-device 206. Device application 108 may collect biometric data 136 from a wearable device 604 on user 202. Wearable device 604 may collect heart rate, blood pressure and other biometric data 136 that may be characteristic of, or indicative of, the identity of user 202. Device application 108 may send biometric data 136 to kernel 104. Biometric analyzer 602 may analyze biometric data 136 and determine whether user 202 is the person truly associated with access credential 132. If a match is found, gatekeeper 224 may allow access for user 202 to meeting application 124. If a match is not found, gatekeeper 224 may deny access for user 202 to meeting application 124.

Figure 7:
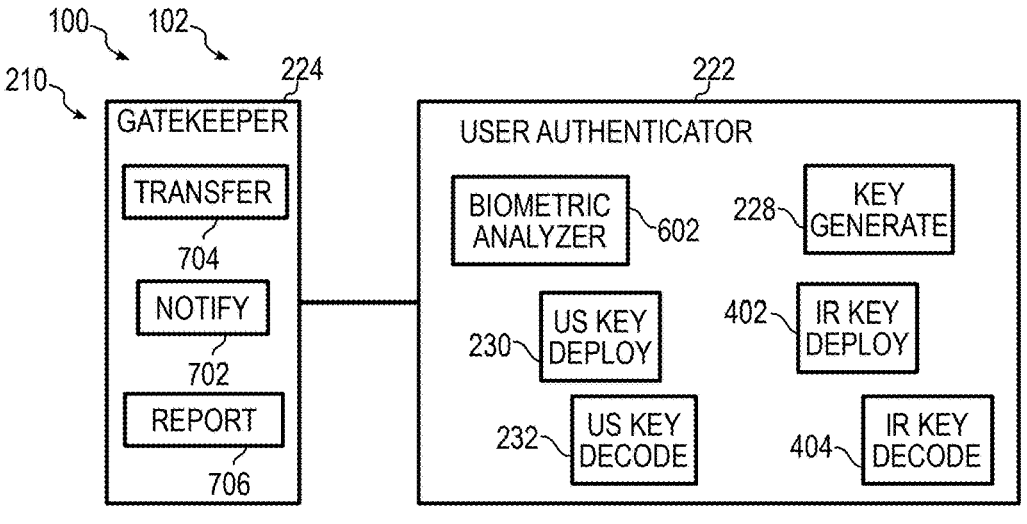
FIG. 7 is a simplified block diagram illustrating example details of the system for real time deepfake identification in virtual meetings, according to some embodiments.

FIG. 7 is a simplified block diagram illustrating example details of system 100 according to an example embodiment. User authenticator 222 may execute in one or more servers 210 as part of authentication application 102. In various embodiments, user authenticator 222 may include key-generate module 228; ultrasonic-key-deploy module 230; ultrasonic-key-decode module 232; infrared key-deploy module 402; infrared key-decode module 404; and biometric analyzer 602, so that authentication of user 202 may be accomplished by any one or more of the techniques described in reference to the previous figures, namely: by use of ultrasonic signal 234; infrared signal 406; and/or biometric data 136. In some embodiments, in addition to deploying ultrasonic signal 234, infrared signal 406 may also be deployed; in other embodiments, in addition to deploying ultrasonic signal 234, biometric data 136 may be used to validate identity of user 202; in yet other embodiments, in addition to deploying ultrasonic signal 234 and infrared signal 406, biometric data 136 may also be collected and used to authenticate user 202; and in yet other embodiments, in addition to deploying infrared signal 406, biometric data 136 may be collected and used to validate user 202.

Gatekeeper 224 may include various modules such as notify module 702; transfer module 704; and report module 706. Notify module 702 may notify meeting-bot 106 to publish an alert in meeting application 124 when a match is not found using any one or more of ultrasonic signal 234, infrared signal 406 and biometric data 136. Notify module 702 may also notify device application 108 to push notifications or alerts to trusted-device 206, alerting user 202 about the failure in authentication. Transfer module 704 may transfer the access process to another method, such as through device application 108, email, text, or other mechanisms authorized by IAM 126. Report module 706 may generate a report comprising a summary of authentication pass events, authentication fail events, etc. to administrator dashboard 112. In some embodiments, report module 706 may generate and send another report to meeting application 124 to enable a decision in meeting application 124 whether to terminate the virtual meeting. Various other gatekeeping functions may also be performed by gatekeeper 224 within the broad scope of the embodiments.

Figure 8:
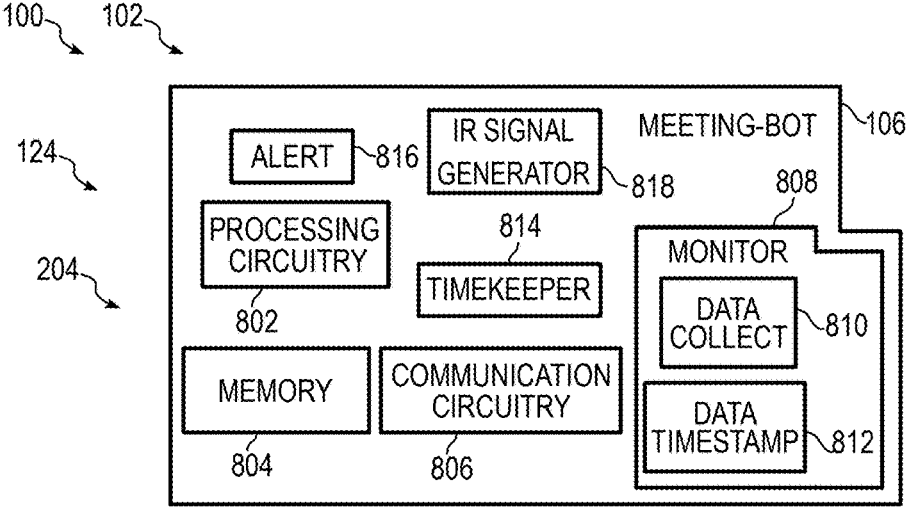
FIG. 8 is a simplified block diagram illustrating example details of the system for real time deepfake identification in virtual meetings, according to some embodiments.

FIG. 8 is a simplified block diagram illustrating example details of system 100 according to an example embodiment. Meeting-bot 106 may execute in meeting application 124 in device 204 as part of authentication application 102. Meeting-bot 106 may execute using processing circuitry 802, memory 804 and communication circuitry 806 of device 204. In various embodiments, processing circuitry 802, memory 804 and communication circuitry 806 may be part of the hardware components of device 204. In some embodiments, processing circuitry 802, memory 804 and communication circuitry 806 may be substantially similar in functionalities and/or structure to processing circuitry 212, memory 214 and communication circuitry 216 as described in reference to FIG. 2A. Meeting-bot 106 may include a monitor module 808 that comprises a data collect module 810 and a data timestamp module 812; a timekeeper 814; an alert module 816; and an infrared signal generator 818.

Monitor module 808 may monitor (e.g., listen, watch, etc.) activities in meeting application 124. Data collect module 810 may collect data 138 (e.g., audio data; video data; infrared data; etc.) and tag it appropriately with access credential 132 of user 202. Timekeeper 814 may record the time (e.g., date; hour; minute; and second) at which data 138 is collected by data collect module 810. Data timestamp module 812 may stamp the recorded times into data 138 to generate timestamped data 140. Meeting-bot 106 may send timestamped data 140 to kernel 104. Kernel 104 may determine whether user 202 associated with particular access credential 132 is authenticated. If the authentication fails, kernel 104 may send a notification to meeting-bot 106. Accordingly, alert module 816 may generate an alert and publish the alert in meeting application 124. In some embodiments, alert module 816 may be used to publish status messages and other such notifications in meeting application 124. In some embodiments, kernel 104 may send instructions 134b to meeting-bot 106 to generate infrared signal 406. Infrared signal generator 818 may access infrared source 408 in device 204 and cause it to generate and emit infrared signal 406.

In some embodiments, meeting-bot 106 may be instantiated when meeting application 124 is opened. In some other embodiments, meeting-bot 106 may be instantiated when any user 202 attempts to access meeting application 124. In some such embodiments, meeting application 124 may notify kernel 104, which may awaken and/or otherwise instantiate meeting-bot 106 in meeting application 124. In some other such embodiments, meeting application 124 may awaken and/or otherwise instantiate meeting-bot 106. In yet other embodiments, meeting-bot 106 may stay awake, polling meeting application 124 periodically for any activity. In various embodiments, meeting-bot 106 may be substantially continuously executing when meeting application 124 is operational, for example during the entirety of the virtual meeting. In various embodiments, meeting-bot 106 may periodically monitor and collect data 138 suitably.

Figure 9:
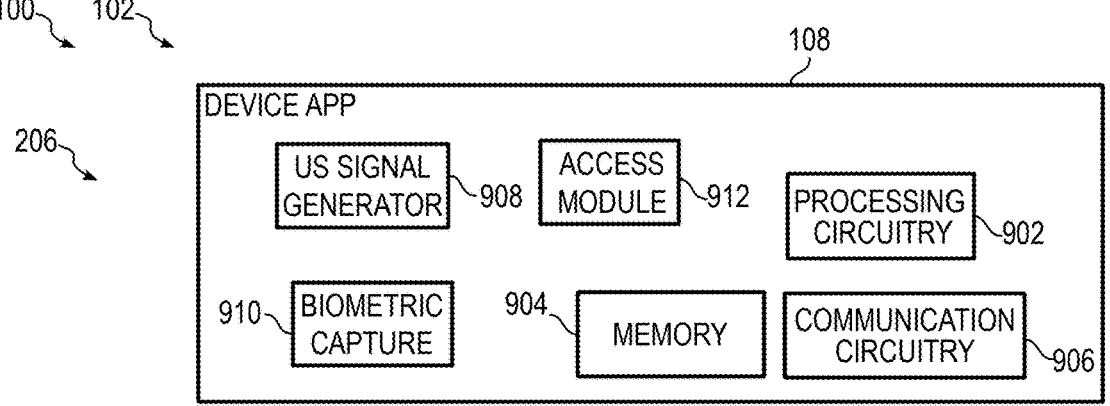
FIG. 9 is a simplified block diagram illustrating example details of the system for real time deepfake identification in virtual meetings, according to some embodiments.

FIG. 9 is a simplified block diagram illustrating example details of system 100 according to an example embodiment. Device application 108 may execute in trusted-device 206 as part of authentication application 102. Device application 108 may execute using processing circuitry 902, memory 904 and communication circuitry 906 of trusted-device 206. In various embodiments, processing circuitry 902, memory 904 and communication circuitry 906 may be part of the hardware components of trusted-device 206. In some embodiments, processing circuitry 902, memory 904 and communication circuitry 906 may be substantially similar in functionalities and/or structure to processing circuitry 212, memory 214 and communication circuitry 216 as described in reference to FIG. 2A. Device application 108 may include an ultrasonic signal generator 908; a biometric capture module 910; and an access module 912.

Kernel 104 may send instructions 134a to device application 108 to generate ultrasonic signal 234. Ultrasonic signal generator 908 may access the appropriate hardware component in trusted-device 206 that can generate ultrasonic signals, such as speakers, and cause it to generate and emit ultrasonic signal 234. In some embodiments, biometric capture module 910 may capture biometric data 136 from wearable device 604 and send biometric data 136 to kernel 104. In some embodiments, when authentication fails due to a lack of match based on ultrasonic signal 234, infrared signal 406 and/or biometric data 136, kernel 104 may send instructions or notifications to device application 108, whereupon access module 912 may activate alternate access mechanisms to meeting application 124 as authorized by IAM 126. In some embodiments, access module 912 may merely provide notifications that alert user 202 to the unauthenticated access without providing additional access mechanisms.

In some embodiments, device application 108 may be instantiated when meeting application 124 is opened (either in trusted-device 206 or another device 204). In some other embodiments, device application 108 may be instantiated when any user 202 attempts to access meeting application 124. In some such embodiments, meeting application 124 may notify kernel 104, which may awaken and/or otherwise instantiate device application 108. In yet other embodiments, device application 108 may stay awake, polling meeting application 124 periodically for any activity. In various embodiments, device application 108 may be substantially continuously executing when meeting application 124 is operational, for example during the entirety of the virtual meeting. In various embodiments, device application 108 may periodically perform various operations as described herein for the duration of the virtual meeting.

Figures 10A, 10B, 10C:
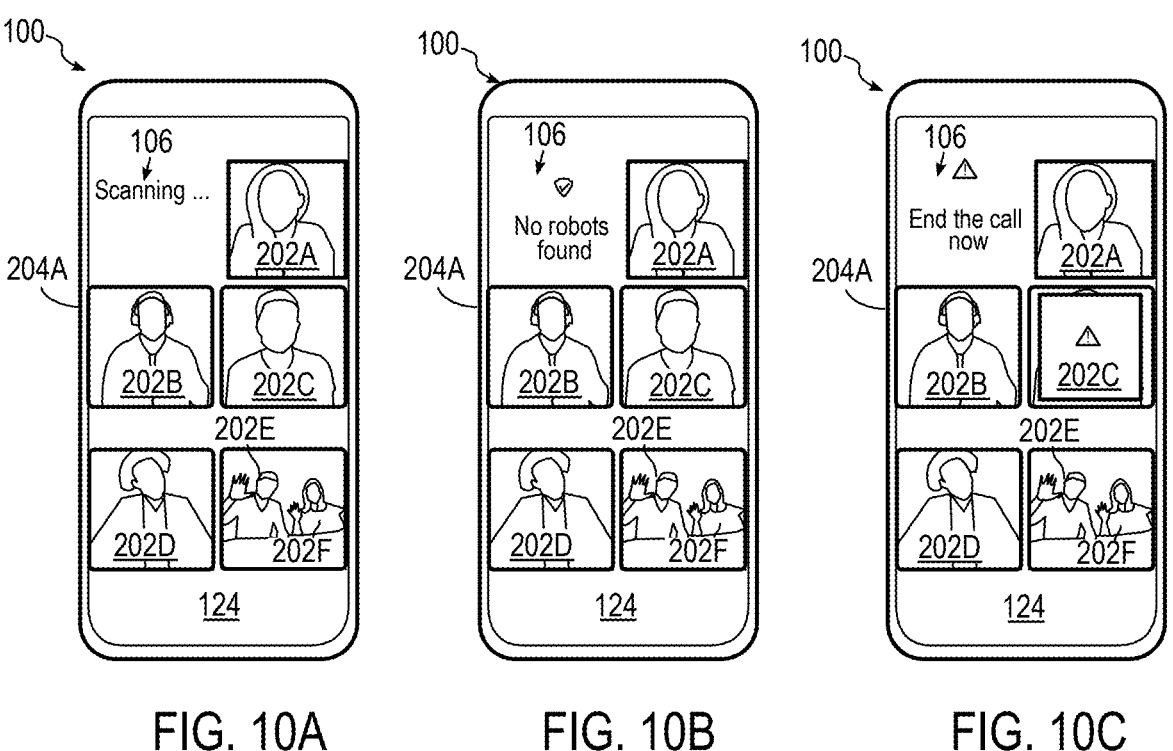
FIGS. 10A-10C are simplified diagrams showing example details of the system for real time deepfake identification in virtual meetings, according to some embodiments.

FIGS. 10A-10C are simplified diagrams illustrating example user interfaces for operations in system 100 according to some embodiments. FIG. 10A shows the user interface of meeting application 124 executing in device 204a of user 202a. Various other users 202b-202f access meeting application 124 through their respective device(s) 204b-204f (not shown). Note that more than one user 202, for example, users 202e and 202f, may access meeting application 124 using a single device 204. In various embodiments, meeting-bot 106 executing in meeting application 124 may monitor meeting application 124 and may publish a suitable notification such as "scanning . . . " while monitoring. In some embodiments, meeting-bot 106 may monitor meeting application 124 in the background without notifying any user 202.

FIG. 10B shows the user interface in a scenario in which all users 202a-202f are found to be authenticated and authorized according to the operations described with reference to previous figures. In some embodiments, meeting-bot 106 may publish a suitable message, such as "no robots found" in meeting application 124. In other embodiments, no message may be published, and the virtual meeting may continue uninterrupted.

FIG. 10C shows the user interface in another scenario in which at least one user 202c is found to be unauthenticated. In the example shown, a warning may be published to end the call, or the particular unauthenticated user 202c may be tagged and called out as a security concern.

Figures 11A, 11B:
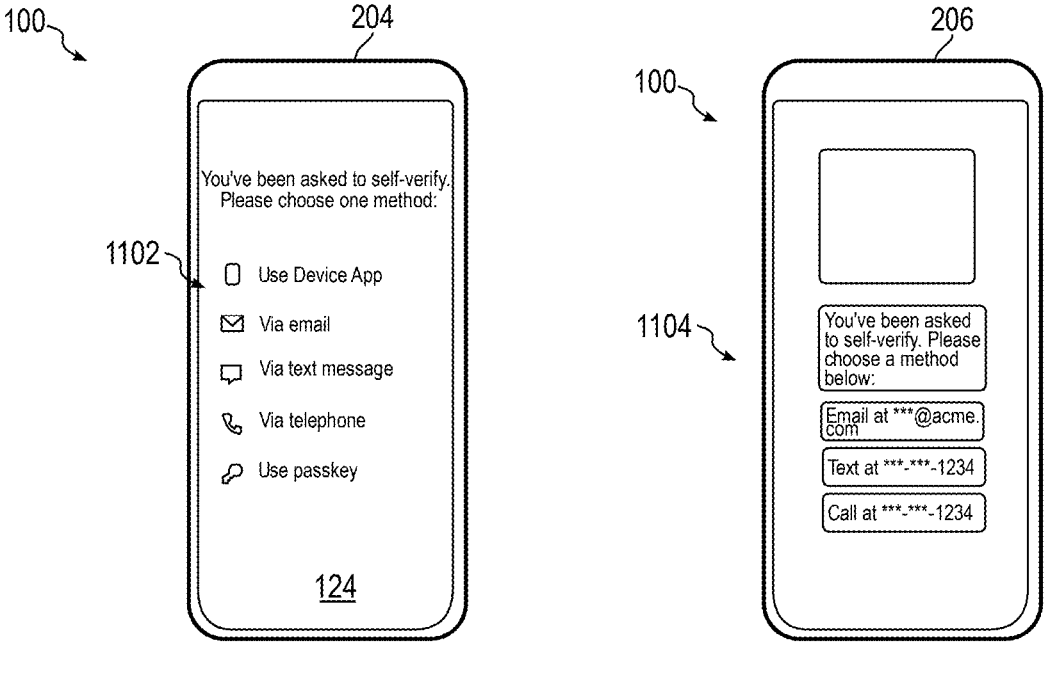
FIGS. 11A-11B are simplified diagrams showing example details of the system for real time deepfake identification in virtual meetings, according to some embodiments.

FIGS. 11A-11B are simplified diagrams illustrating other example user interfaces for operations in system 100 according to some embodiments. FIG. 11A shows a notification 1102 published in meeting application 124 to the particular user 202 that has failed authentication. Notification 1102 may be published by meeting-bot 106 in some embodiments. In other embodiments, notification 1102 may be published by meeting application 124. Notification 1102 may present various alternative mechanisms for accessing meeting application 124. Examples of such mechanisms include accessing through device application 108; accessing through a link sent via email; accessing through a link sent via text message; accessing through an option sent via telephone; accessing using a passkey; etc. Various such mechanisms may be provisioned by IAM 126. Authentication application 102 may merely present these options without controlling or determining the types of options, the mechanisms for accessing according to these alternatives, etc.

FIG. 11B shows a notification 1104 published in trusted-device 206 associated with the particular user 202 who has failed authentication. Notification 1104 may comprise a series of text messages in the example shown, providing various alternative mechanisms for accessing meeting application 124. Note that notification 1104 may comprise other forms of notifications, such as emails; push notifications in device application 108; etc. within the broad scope of the embodiments.

Figure 12:
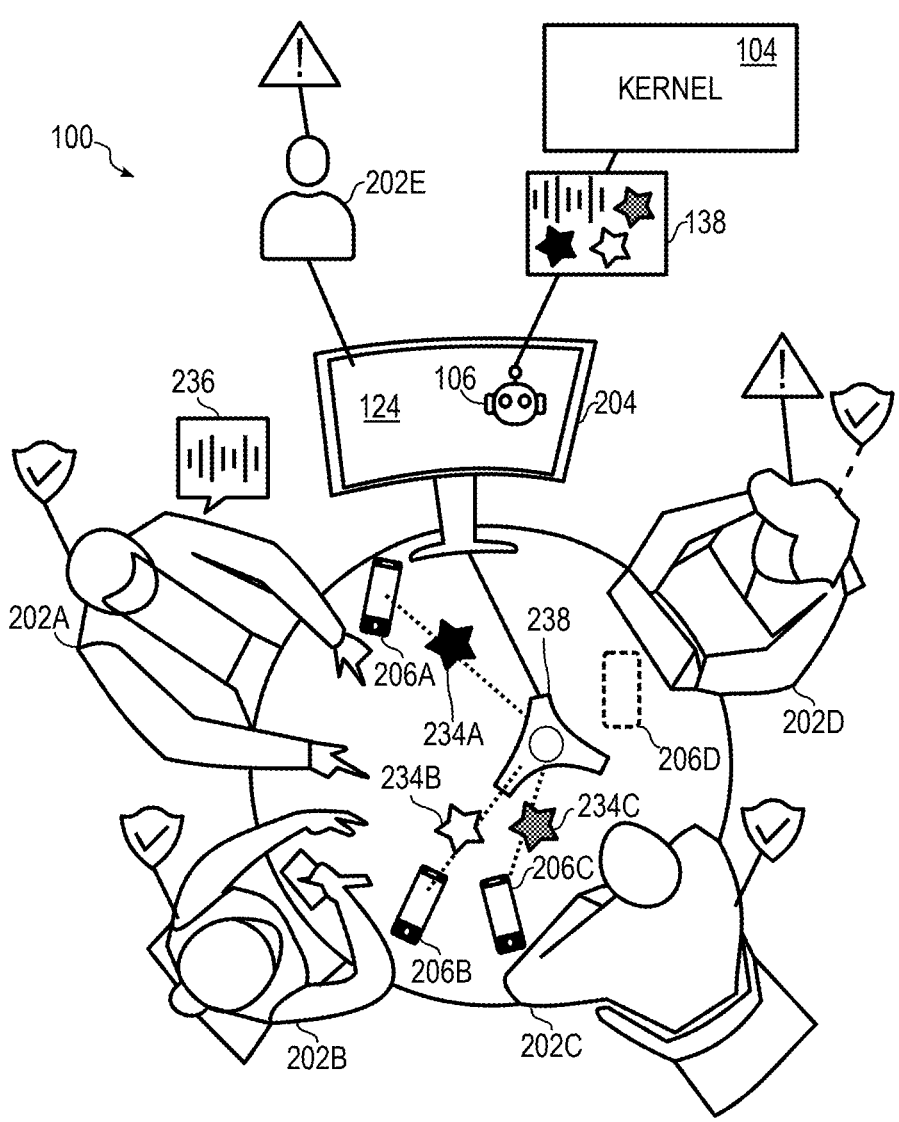
FIG. 12 is a simplified diagram illustrating example details in the system for real time deepfake identification in virtual meetings, according to some embodiments.

FIG. 12 is a simplified diagram illustrating example details in system 100 according to some embodiments. Assume that users 202a-202e are accessing meeting application 124 such that users 202a-202d are accessing meeting application 124 altogether on device 204 and user 202e is accessing meeting application 124 on another device. For example, users 202a-202d are all together in one room, face-to-face, in-person, and user 202e is remote. Each user 202a-202e is associated with respective access credential 132a-132e (not shown to prevent clutter). Users 202a-202d may access meeting application 124 by one of at least two ways: using a single access credential, say access credential 132a associated with user 202a; or using separate access credentials 132a-132d corresponding to users 202a-202d, respectively.

In one example, access credential 132a may be used to access meeting application 124 on behalf of users 202a-202e. Data 138 collected by meeting-bot 106 in such a scenario will be associated with access credential 132a only. However, because all four users 202a-202d are present in-person, as among them, the risk of deepfake is zero. User 202e may access meeting application 124 separately using respective access credential 132e.

In another example, each user 202a-202e may separately log into meeting application 124 using respective access credential 132a-132e. Assume, merely for the sake of explanation that trusted-device 206d associated with user 202d present in person at the meeting, and trusted-device 206e associated with remote user 202e, are not proximate to respective microphones 238. In this example, during operation of system 100, each of trusted-device 206a-206e may generate and transmit ultrasonic signal 234a-234e. Each ultrasonic signal 234a-234e encodes a different cryptographic key. Because trusted-device 206d and 206e are not proximate to respective microphone 238, data 138 collected by meeting-bot 106 and sent to kernel 104 may include ultrasonic signals 234a-234c but may not include ultrasonic signals 234d and 234e. As a result, users 202d and 202e may be flagged as unauthentic. A notification may be sent to meeting application 124, alerting users 202a-202e that users 202d and 202e are unauthentic.

Because user 202d is attending meeting application 124 in person, their authenticity is not really in question, but is merely an artefact of authentication application 102. In such a scenario, security policies set by IAM 126 may be applied to override the access refusal. For example, user 202d may opt to provide authentication credentials by other means, such as by accessing meeting application 124 using access credential 132d on one or more of other trusted-devices 206a-206c. In such a case, the combination of valid access credential 132d through one of trusted-devices 206a-206c may be sufficient to prove authenticity according to policies set by IAM 126.

For example, the presence and authenticity of user 202a associated with trusted-device 206a has already been verified by kernel 104. Thus, when user 202d accesses meeting application 124 using trusted-device 206a, there may arise a presumption that such access is authorized by user 202a, which may be sufficient in the enterprise context. Whether such security policies set by IAM 126 for overriding authentication application 102 are sufficient to prevent security breaches is beyond the scope of the present disclosure.

On the other hand, user 202e, who is also flagged as unauthentic, cannot access meeting application 124 using any of trusted-devices 206a-206c. Hence, user 202e may use alternative mechanisms as described previously to access meeting application 124. If such alternative mechanisms fail, then user 202e may be refused access to meeting application 124 within the scope of the embodiments discussed herein. Thus, embodiments of system 100 may use suitable security policies of enterprise security management 120 judiciously to handle scenarios of varying trust scores efficiently. In some embodiments, security policies of IAM 126 may override access denials by authentication application 102 in situations where the trust score is high, as with in-person participants. On the other hand, in situations where the trust score is low, as with remote participants, security policies of IAM 126 may not override access denials without additional justification. This close interplay between authentication application 102 and enterprise security management 120 tailored to trust score variabilities between different scenarios may enable an efficient, seamless security mechanism for authenticating users 202 in meeting application 124.

Figure 13:
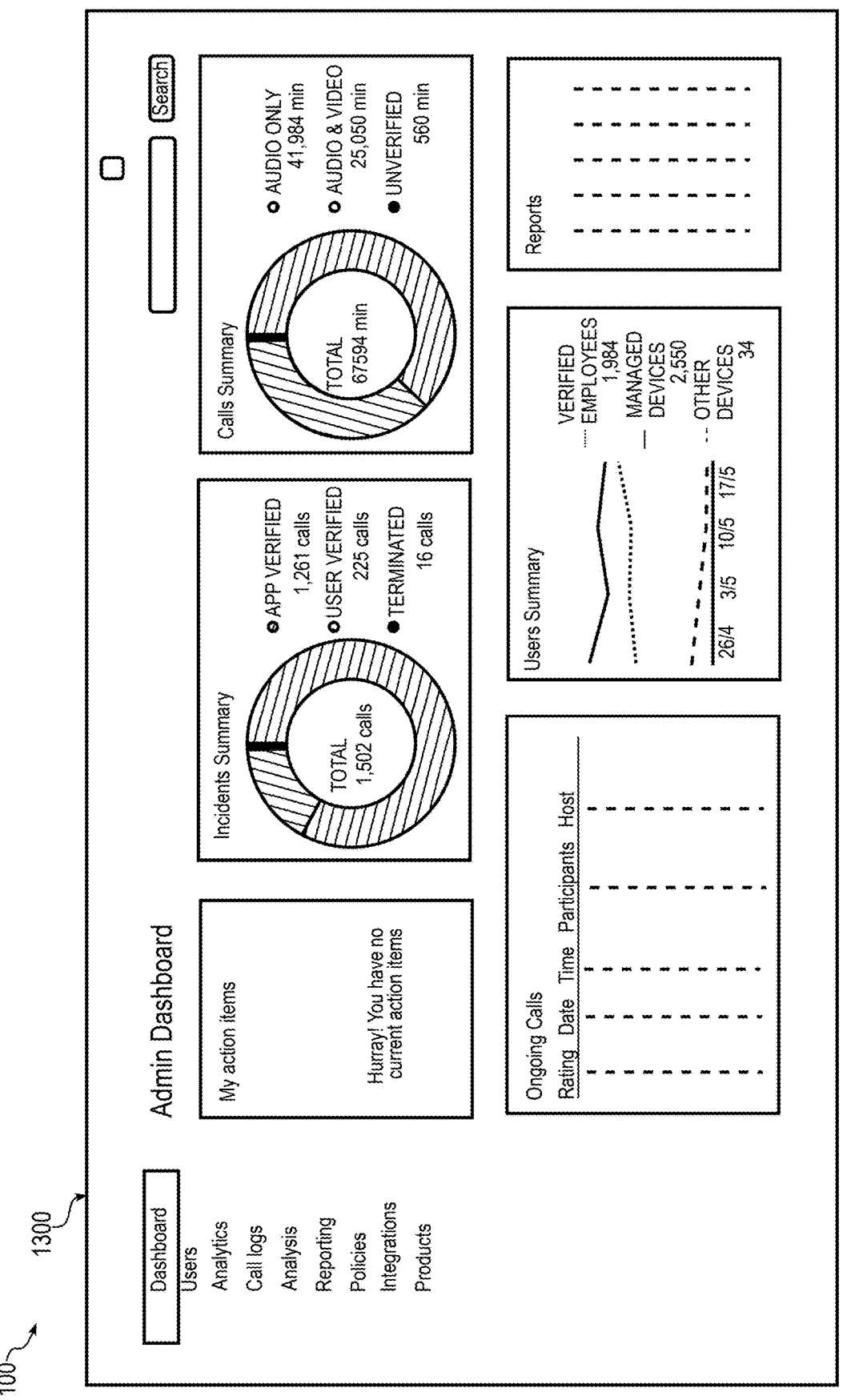
FIG. 13 is a simplified diagram illustrating example details in the system for real time deepfake identification in virtual meetings, according to some embodiments.

FIG. 13 is a simplified diagram illustrating an example user interface 1300 of administrator dashboard 112 in system 100 according to some embodiments. Kernel 104 may compile data over time across many users within the enterprise and present the information in an accessible manner in user interface 1300. For example, call summary, incident summary, ongoing call information, user summary and other types of reports may be presented. The format and amount of information, the time frame of reporting, etc. may be configured in administrator dashboard 112 based on particular needs. Such information may be presented on demand, at a scheduled cadence, or according to other schedules as desired based on particular needs. Any suitable information collected by authentication application 102 may be stored and presented in administrator dashboard 112 without departing from the scope of the embodiments.

Figure 14:
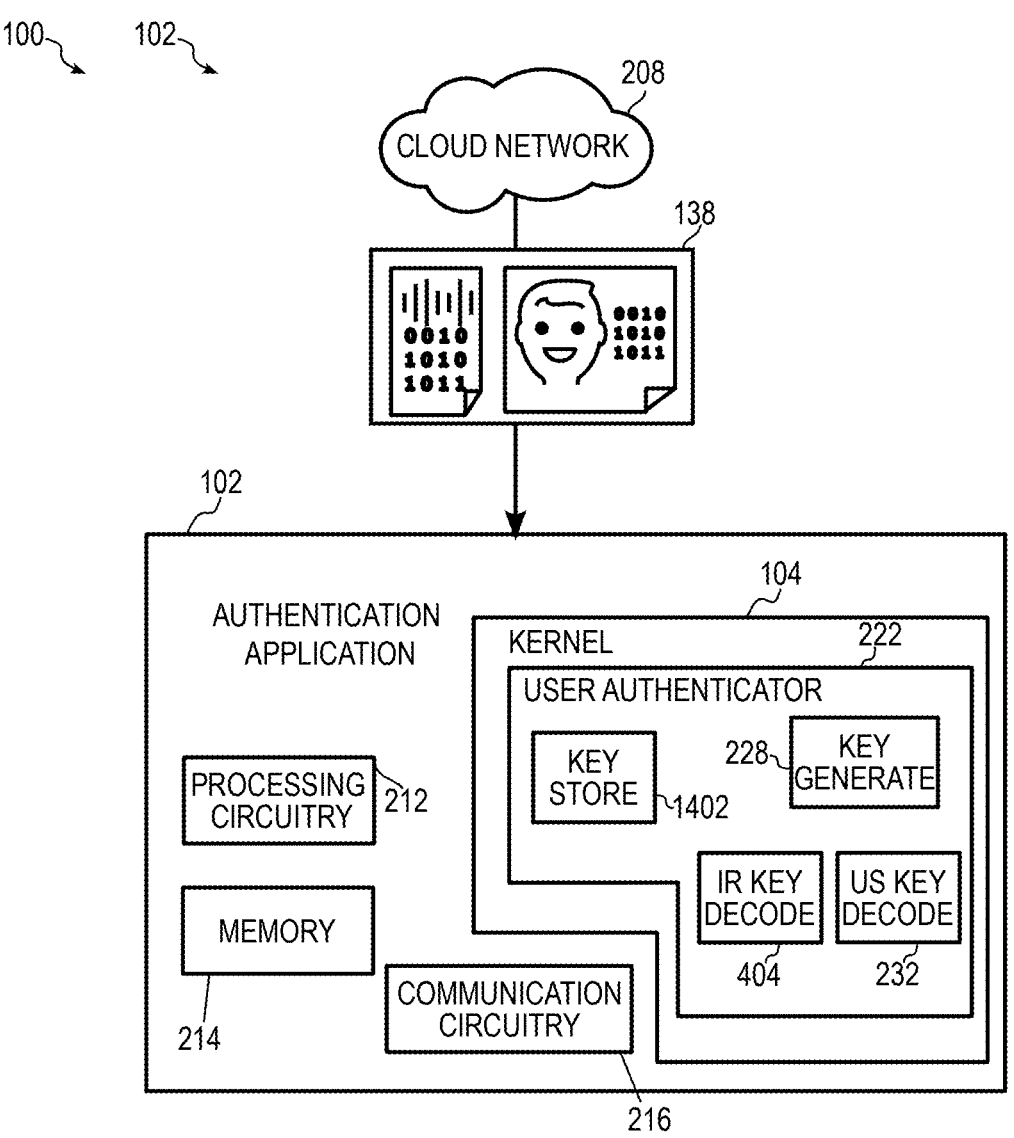
FIG. 14 is a simplified diagram illustrating example details in the system for real time deepfake identification in virtual meetings, according to some embodiments.

FIG. 14 is a simplified diagram illustrating example details in system 100 according to some embodiments. In some scenarios, data 138 from the virtual meeting may be recorded and reused at a later time. Such may be the case in a corporate espionage situation, in which an insider may be recording the audio and/or video from the virtual meeting for use at a later time, and it may be desired by the enterprise to identify the particular person who is associated with the recording. In another example, the data recorded in the virtual meeting, or the person associated therewith, may have to be authenticated for a judicial proceeding or another official purpose. In such cases, authentication application 102 may enable user authentication from data 138.

During operation, kernel 104 may receive data 138 from a remote device over cloud network 208. Data 138 may comprise at least one of audio data and video data, possibly recorded from a previous virtual meeting. The remote device may be a personal computer or smartphone in some embodiments. In other embodiments, the remote device may be a server. In yet other embodiments, the remote device may be a data store, such as a memory stick, memory disk, etc. Kernel 104 may identify a first cryptographic key in data

138. For example, ultrasonic-key-decode module 232 may identify the first cryptographic key encoded as ultrasonic signal 234 in the audio data portion of data 138. In another example, infrared key-decode module 404 may identify the first cryptographic key encoded as infrared signal 406 in the video data portion of data 138. In some examples, separate first cryptographic keys may be identified in the audio data portion and the video data portion of data 138 encoded as ultrasonic signal 234 and infrared signal 406, respectively.

Kernel 104 may compare the first cryptographic key with a second cryptographic key associated with a previous virtual meeting. In various embodiments, the second cryptographic key may be stored in a key store 1402 and retrieved therefrom. Key store 1402 may comprise a database, data store, data lake, etc. of cryptographic keys. Any suitable mechanism to store the cryptographic keys is included in the broad scope of the embodiments. Each of the second cryptographic keys may be associated with corresponding timestamps, which in turn may be associated with corresponding virtual meetings. In some embodiments, the cryptographic keys may be stored with their timestamps of creation and corresponding virtual meeting identifier. In other embodiments, the cryptographic keys may be stored with only the virtual meeting identifier. In yet other embodiments, the cryptographic keys may be stored with their timestamps, and another database may be queried to identify the virtual meeting associated with the timestamp. Various such configurations may be encompassed within the broad scope of the embodiments described herein.

In some embodiments, the first cryptographic key may be compared with a plurality of second cryptographic keys in key store 1402. The comparison may include parsing the second cryptographic keys stored in 1402 for a match with the first cryptographic key using any parse and match algorithm as desired based on particular needs. In some embodiments, kernel 104 may first identify a timestamp in data 138 and determine a subset of the virtual meetings in key store 1402, the virtual meetings being associated with the time and/or date of the timestamp in data 138. The comparison may be performed on this subset of data in key store 1402. This process can reduce the amount of data to be compared, thus speeding up analysis time. Kernel 104 may identify data 138 as associated with the previous virtual meeting when a match is found between the first cryptographic key and the second cryptographic key.

If no match is found, data 138 may be identified as not associated with any previous virtual meeting in system 100 and tagged as safe or clear. In some cases, no match may be found because of the time period for which data is stored in key store 1402. The time period for which data is stored may be set according to policies of IAM 126 in some embodiments. Thus, even though data 138 may actually be from a previous virtual meeting, the data associated with the previous virtual meeting may have been deleted from key store 1402 according to data retention policies of IAM 126. Such may be the case when any security threat from old data may be inconsequential for the enterprise. In some cases, only data from certain virtual meetings that are deemed important may be stored for an indefinite period, in which case, if a match is not found, the determination may indicate that the data is not from such important virtual meetings. Any suitable data retention policy may be implemented according to the security needs of the enterprise within system 100 without departing from the scope of the embodiments.

Although the present disclosure has been described in detail with reference to particular arrangements and configurations, these example configurations and arrangements may be changed significantly without departing from the scope of the present disclosure. For example, although the present disclosure has been described with reference to particular types of components, system 100 may be implemented using other components that perform substantially the same functions in similar ways. Moreover, although system 100 has been illustrated with reference to particular elements and operations that facilitate various control system process, these elements, and operations may be replaced by any suitable architecture or process that achieves the intended functionality of system 100.

Example Methods

FIG. 15 is a simplified flow diagram of an example method 1500 for real time deepfake identification in virtual meetings according to some embodiments disclosed herein. At 1502, kernel 104 may send instructions 134a to trusted-device 206 to generate and emit ultrasonic signal 234, trusted-device 206 being associated with user 202 having access credential 132 to meeting application 124. Ultrasonic signal 234 may comprise ultrasonic signals encoding a previously generated cryptographic key associated with access credential 132. At 1504, kernel 104 may receive in real time from meeting application 124, data 138 associated with access credential 132. In various embodiments, such data 138 may comprise audio data. Data 138 may be aggregated with other data from other users as well; kernel 104 may separate and extract data 138 associated with a particular one of access credential 132 in some embodiments.

At 1506, kernel 104 may search data 138 for ultrasonic signal 234. At 1508, a determination may be made whether ultrasonic signal 234 is found in data 138. Responsive to finding ultrasonic signal 234 in data 138, a further determination may be made at 1510 whether ultrasonic signal 234 encodes the cryptographic key previously generated and associated with access credential 132. Responsive to finding that ultrasonic signal 234 encodes the previously generated cryptographic key, at 1512, kernel 104 may categorize access credential 132 as authentic and allow access to meeting application 124. On the other hand, at 1508, if a determination is made that ultrasonic signal 234 is not found in data 138, or at 1510, if another determination is made that ultrasonic signal 234 does not encode the correct cryptographic key, at 1514, access credential 132 may be categorized as unauthentic and rejected from meeting application 124.

Figure 16:
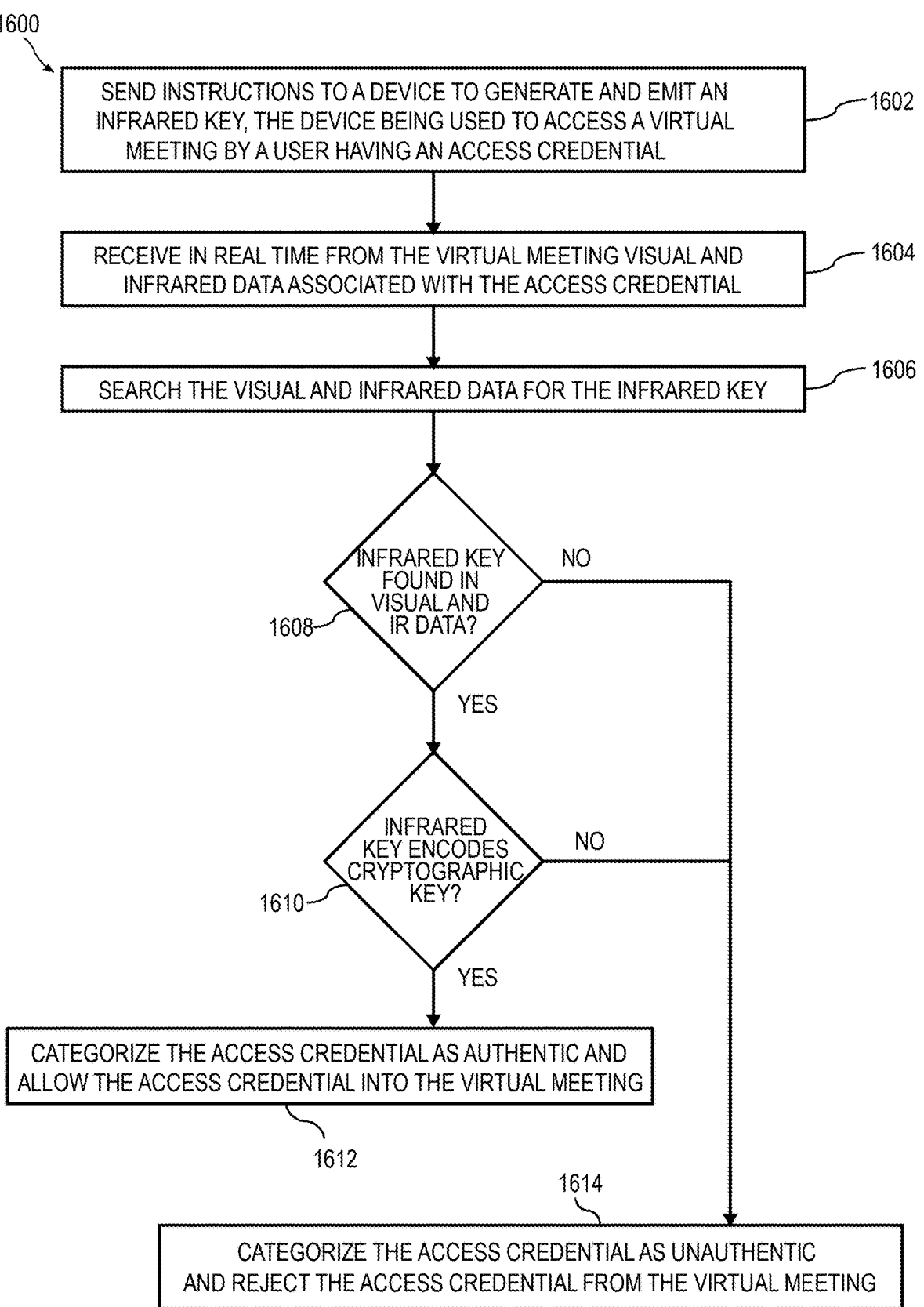
FIG. 16 is a simplified flow diagram of another example method for real time deepfake identification in virtual meetings, according to some embodiments disclosed herein.

FIG. 16 is a simplified flow diagram of an example method 1600 for real time deepfake identification in virtual meetings according to some embodiments disclosed herein. At 1602, kernel 104 may send instructions 134b to meeting-bot 106 executing in device 204 to generate and emit infrared signal 406, device 204 being used to access meeting application 124 by user 202 having access credential 132. Infrared signal 406 may comprise infrared signals encoding a previously generated cryptographic key associated with access credential 132. At 1604, kernel 104 may receive in real time from meeting application 124 data 138 associated with access credential 132. In various embodiments, such data 138 may comprise visual and infrared data. Data 138 may be aggregated with other data from other users as well; kernel 104 may separate and extract data 138 associated with a particular one of access credential 132 in some embodiments.

At 1606, kernel 104 may search data 138 comprising the visual and infrared data for infrared signal 406. At 1608, a determination may be made whether infrared signal 406 is found in data 138. Responsive to finding infrared signal 406 in data 138, a further determination may be made at 1610 whether infrared signal 406 encodes the cryptographic key previously generated and associated with access credential 132. Responsive to finding that infrared signal 406 encodes the previously generated cryptographic key, at 1612, kernel 104 may categorize access credential 132 as authentic and allow access to meeting application 124. On the other hand, at 1608, if a determination is made that infrared signal 406 is not found in data 138, or at 1610, if another determination is made that infrared signal 406 does not encode the correct cryptographic key, at 1614, access credential 132 may be categorized as unauthentic and rejected from meeting application 124.

Figure 17:
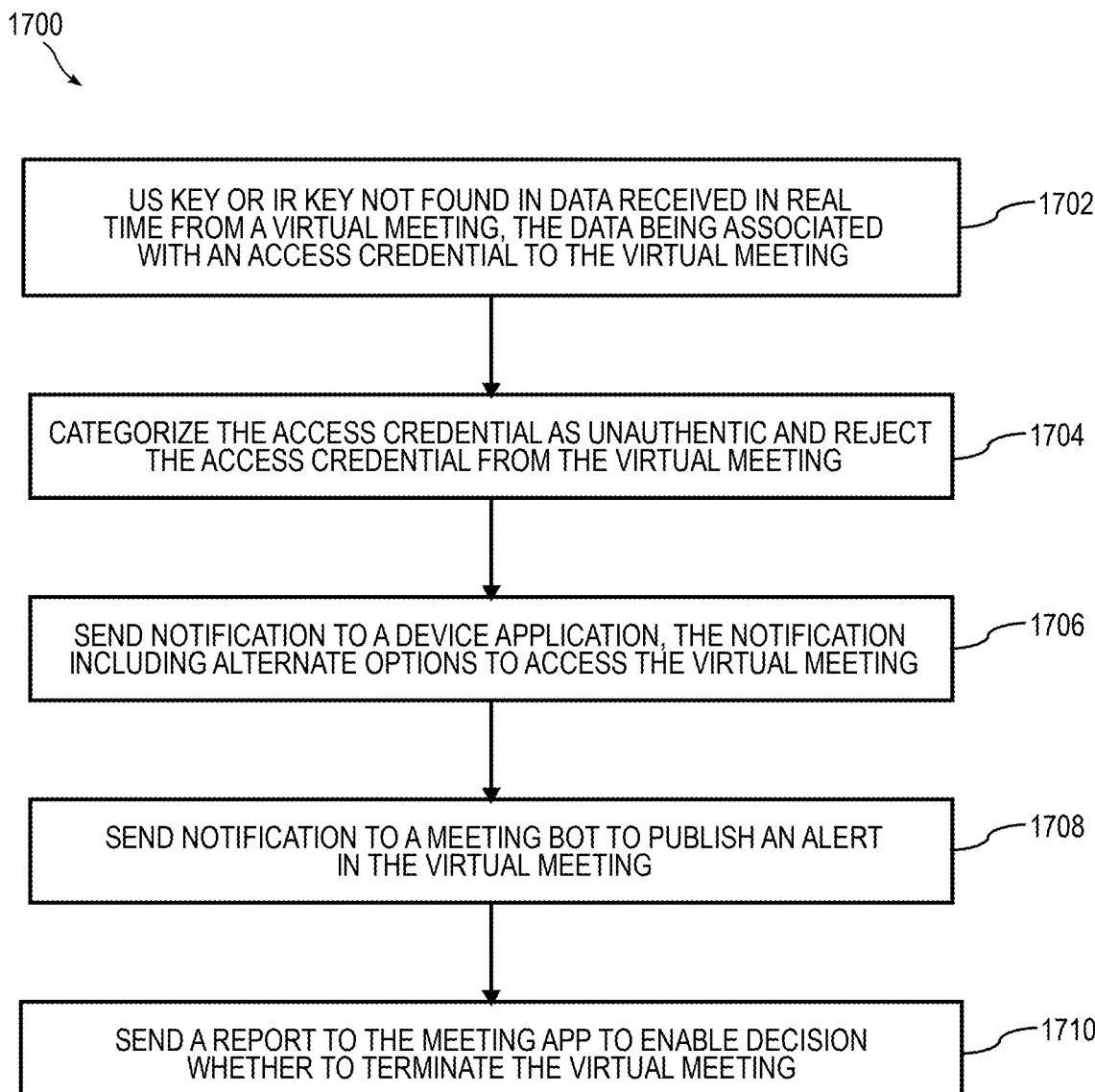
FIG. 17 is a simplified flow diagram of yet another example method in the system for real time deepfake identification in virtual meetings, according to some embodiments disclosed herein.

FIG. 17 is a simplified flow diagram of an example method 1700 in system 100 according to some embodiments disclosed herein. At 1702, a determination may be made that ultrasonic signal 234 and/or infrared signal 406 is not contained in data 138 received in real time from a virtual meeting ongoing in meeting application 124. Data 138 is associated with access credential 132 to meeting application 124. At 1704, access credential 132 may be categorized as unauthentic and rejected from the virtual meeting running in meeting application 124. At 1706, gatekeeper 224 may send a notification to device application 108, the notification including alternate options to access the virtual meeting running in meeting application 124. At 1708, gatekeeper 224 may send a notification to meeting-bot 106 to publish an alert in the virtual meeting running in meeting application 124. At 1710, gatekeeper 224 may send a report to meeting application 124 to enable a decision whether to terminate the virtual meeting.

Figure 18:
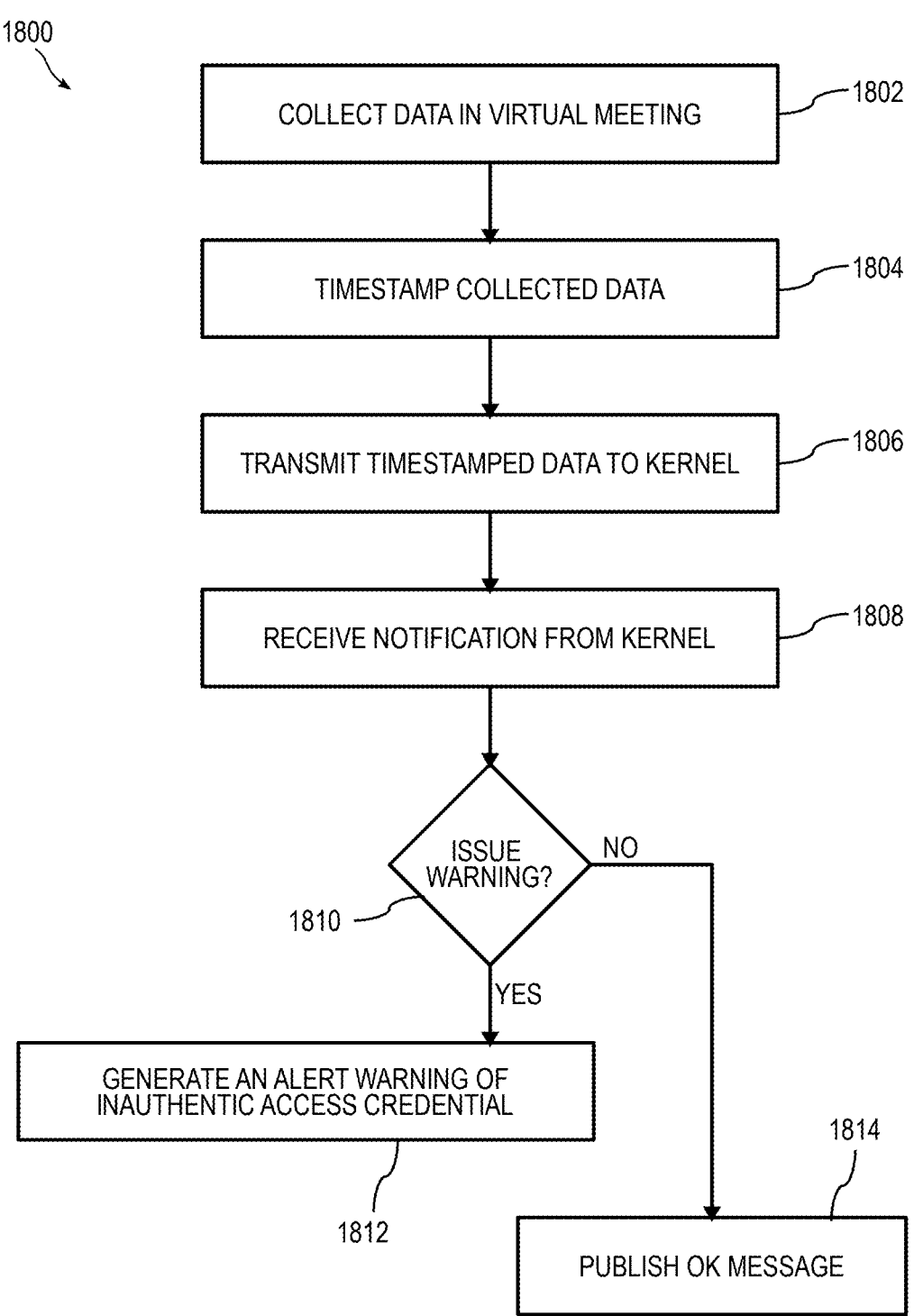
FIG. 18 is a simplified flow diagram of yet another example method in the system for real time deepfake identification in virtual meetings according to some embodiments disclosed herein.

FIG. 18 is a simplified flow diagram of an example method 1800 in system 100 according to some embodiments disclosed herein. At 1802, meeting-bot 106 may collect data 138 in a virtual meeting running in meeting application 124. At 1804, meeting-bot 106 may timestamp collected data 138 to generate timestamped data 140. At 1806, meeting-bot 106 may send timestamped data 140 to kernel 104. At 1808, meeting-bot 106 may receive one or more notifications from kernel 104. The notifications may indicate that a particular one or more access credential 132 is not authentic. At 1810, a determination may be made whether to issue a warning. The determination may be based on policies set by meeting application 124 in some embodiments. In other embodiments, the determination may be based on policies set by IAM 126. If a warning is to be issued, at 1812, meeting-bot 106 may generate an alert warning of inauthentic access credential 132. The user may be identified in some embodiments. The user may not be identified in other embodiments. However, at 1810, if a determination is made that the warning is not to be issued, for example, because all users 202 are authentic, at 1814, an "OK" message may be published in the virtual meeting.

FIG. 19 is a simplified flow diagram of an example method 1900 in system 100 according to some embodiments disclosed herein. At 1902, kernel 104 may receive data 138 from a remote device over cloud network 208, data 138 comprising at least one of audio data and video data. The remote device may be a personal computer or smartphone in some embodiments. In other embodiments, the remote device may be a server. In yet other embodiments, the remote device may be a data store, such as a memory stick, memory disk, etc. At 1904, kernel 104 may identify a first cryptographic key in data 138. For example, ultrasonic-key-decode module 232 may identify the first cryptographic key encoded as ultrasonic signal 234 in the audio data portion of data 138. In another example, infrared key-decode module 404 may identify the first cryptographic key encoded as infrared signal 406 in the video data portion of data 138. In some examples, separate first cryptographic keys may be identified in the audio data portion and the video data portion of data 138 encoded as ultrasonic signal 234 and infrared signal 406, respectively.

At 1906, kernel 104 may compare the first cryptographic key with a second cryptographic key associated with a previous virtual meeting. In various embodiments, the second cryptographic key is stored in key store 1402 and retrieved therefrom. In some embodiments, the first cryptographic key may be compared with a plurality of second cryptographic keys in key store 1402. The comparison may include parsing the second cryptographic keys stored in 1402. Each of the second cryptographic keys may be associated with corresponding timestamps, which in turn may be associated with corresponding virtual meetings. In some embodiments, kernel 104 may first identify a timestamp in data 138 and determine a subset of the virtual meetings in key store 1402, the virtual meetings being associated with the time and/or date of the timestamp in data 138. The comparison may be performed on this subset of data in key store 1402. This process can reduce the amount of data to be compared, thus speeding up analysis time.

At 1908, kernel 104 may identify data 138 as associated with the previous virtual meeting when a match is found between the first cryptographic key and the second cryptographic key. Such may be the case when a security threat arises from within the enterprise, for example, from disgruntled employees or insiders involved in corporate espionage. In yet another example, data 138 may be used as evidence in judicial proceedings, and the match can authenticate data 138 as being from the virtual meeting at issue. If no match is found, data 138 may be identified as not associated with any previous virtual meeting in system 100 and tagged as safe or clear.

In various embodiments, the operations described in FIGS. 15-19 are performed automatically without human intervention. Although FIGS. 15-19 illustrate various operations performed in a particular order, this is simply illustrative, and the operations discussed herein may be reordered and/or repeated as suitable. Further, additional operations which are not illustrated may also be performed without departing from the scope of the present disclosure. Also, various ones of the operations discussed herein with respect to FIGS. 15-19 may be modified in accordance with the present disclosure to facilitate operations of system 100 as disclosed herein. Although various operations are illustrated in FIGS. 15-19 once each, the operations may be repeated as often as desired.

It is important to note that the operations described with reference to the preceding figures illustrate only some of the possible scenarios that may be executed by, or within, system 100. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion.

Select Examples

Example 1 provides a method, comprising: sending instructions to a device to generate and emit an ultrasonic signal, the device being associated with a user having access credential to a virtual meeting; receiving in real time from the virtual meeting, audio data associated with the access credential; searching the audio data for the ultrasonic signal; responsive to finding the ultrasonic signal in the audio data, categorizing the access credential as authentic and allowing the access credential into the virtual meeting; and responsive to not finding the ultrasonic signal in the audio data, categorizing the access credential as unauthentic and rejecting the access credential from the virtual meeting.

Example 2 provides the method of example 1, further comprising repeating sending the instructions to generate and emit the ultrasonic signal, receiving the audio data, searching the audio data for the ultrasonic signal, and allowing or rejecting the access credential according to a predetermined schedule.

Example 3 provides the method of example 2, in which the ultrasonic signal is different in each repetition.

Example 4 provides the method of any one of examples 1-3, in which the device is a first device, and the virtual meeting is accessed on a second device different from the first device.

Example 5 provides the method of any one of examples 1-3, in which the virtual meeting is accessed on the device.

Example 6 provides the method of any one of examples 1-5, in which the device is a smartphone.

Example 7 provides the method of any one of examples 1-6, further comprising analyzing the audio data to determine proximity of the device to the user.

Example 8 provides non-transitory computer-readable tangible media that includes instructions for execution, which when executed by a processor of a computing device, is operable to perform operations comprising: sending instructions to a device to generate and emit an ultrasonic signal, the device being associated with a user having access credential to a virtual meeting; receiving in real time from the virtual meeting audio data associated with the access credential; searching the audio data for the ultrasonic signal; responsive to finding the ultrasonic signal in the audio data, categorizing the access credential as authentic and allowing the access credential into the virtual meeting; and responsive to not finding the ultrasonic signal in the audio data, categorizing the access credential as unauthentic and rejecting the access credential from the virtual meeting.

Example 9 provides the non-transitory computer-readable tangible media of example 8, in which the operations further comprise repeating sending the instructions to generate and emit the ultrasonic signal, receiving the audio data, searching the audio data for the ultrasonic signal, and allowing or rejecting the access credential according to a predetermined schedule.

Example 10 provides the non-transitory computer-readable tangible media of example 9, in which the ultrasonic signal is different in each repetition.

Example 11 provides the non-transitory computer-readable tangible media of any one of examples 8-10, in which the device is a first device, and the virtual meeting is accessed on a second device different from the first device.

Example 12 provides the non-transitory computer-readable tangible media of any one of examples 8-10, in which the virtual meeting is accessed on the device.

Example 13 provides the non-transitory computer-readable tangible media of any one of examples 8-12, in which the device is a smartphone.

Example 14 provides the non-transitory computer-readable tangible media of any one of examples 8-13, in which the operations further comprise analyzing the audio data to determine proximity of the device to the user.

Example 15 provides an apparatus comprising: a processing circuitry; a memory storing data; and a communication circuitry, in which the processing circuitry executes instructions associated with the data, the processing circuitry is coupled to the communication circuitry and the memory, and the processing circuitry and the memory cooperate, such that the apparatus is configured for: sending instructions to a device to generate and emit an ultrasonic signal, the device being associated with a user having access credential to a virtual meeting; receiving in real time from the virtual meeting, audio data associated with the access credential; searching the audio data for the ultrasonic signal; responsive to finding the ultrasonic signal in the audio data, categorizing the access credential as authentic and allowing the access credential into the virtual meeting; and responsive to not finding the ultrasonic signal in the audio data, categorizing the access credential as unauthentic and rejecting the access credential from the virtual meeting.

Example 16 provides the apparatus of example 15, further configured for repeating sending the instructions to generate and emit the ultrasonic signal, receiving the audio data, searching the audio data for the ultrasonic signal, and allowing or rejecting the access credential according to a predetermined schedule.

Example 17 provides the apparatus of example 16, in which the ultrasonic signal is different in each repetition.

Example 18 provides the apparatus of any one of examples 15-17, in which the device is a first device, and the virtual meeting is accessed on a second device different from the first device.

Example 19 provides the apparatus of any one of examples 15-18, in which the virtual meeting is accessed on the device.

Example 20 provides the apparatus of any one of examples 15-19, further configured for analyzing the audio data to determine proximity of the device to the user.

The above description of illustrated implementations of the disclosure, including what is described in the abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize.

The invention claimed is:

1. A method, comprising:

initiating, in a first device, an instance of a virtual meeting in response to receiving access credential of a user;

responsive to initiating the instance, generating, in a second device remotely located from the first device over a cloud network, a cryptographic key unique to the user and the instance;

sending instructions from the second device to a device application executing in a third device associated with the user, the third device being remotely located from the second device over the cloud network, wherein the device application causes the third device to generate and emit an ultrasonic signal encoding the cryptographic key according to the instructions;

receiving, at the second device, in real time from the virtual meeting executing in the first device, audio data associated with the access credential;

searching, at the second device, the audio data for the ultrasonic signal;

responsive to finding the ultrasonic signal in the audio data, categorizing at the second device, the access credential as authentic and allowing the access credential into the virtual meeting executing in the first device; and responsive to not finding the ultrasonic signal in the audio data, categorizing at the second device the access credential as unauthentic and rejecting the access credential from the virtual meeting executing in the first device.

2. The method of claim 1, further comprising repeating sending the instructions to generate and emit the ultrasonic signal, receiving the audio data, searching the audio data for the ultrasonic signal, and allowing or rejecting the access credential according to a predetermined schedule.

3. The method of claim 2, wherein the ultrasonic signal is different in each repetition.

4. The method of claim 1, wherein the first device is different from the third device.

5. The method of claim 1, wherein the first device is same as the third device.

6. The method of claim 1, wherein the third device is a smartphone.

7. The method of claim 1, further comprising analyzing the audio data to determine proximity of the first device to the user.

8. Non-transitory computer-readable tangible media that includes instructions for execution, which when executed by a processor of a first computing device, is operable to perform operations comprising:

initiating, in a second computing device remotely located from the first computing device over a cloud network, an instance of a virtual meeting in response to receiving access credential of a user;

responsive to initiating the instance, generating, in the first computing device, a cryptographic key unique to the user and the instance;

sending instructions from the first computing device to a device application executing in a third computing device associated with the user, the third computing device being remotely located from the first computing device over the cloud network, wherein the device application causes the third computing device to generate and emit an ultrasonic signal encoding the cryptographic key according to the instructions;

receiving, at the first computing device, in real time from the virtual meeting executing in the second computing device, audio data associated with the access credential;

searching, at the first computing device, the audio data for the ultrasonic signal;

responsive to finding the ultrasonic signal in the audio data, categorizing, at the first computing device, the access credential as authentic and allowing the access credential into the virtual meeting; and responsive to not finding the ultrasonic signal in the audio data, categorizing, at the first computing device, the access credential as unauthentic and rejecting the access credential from the virtual meeting.

9. The non-transitory computer-readable tangible media of claim 8, wherein the operations further comprise repeating sending the instructions to generate and emit the ultrasonic signal, receiving the audio data, searching the audio data for the ultrasonic signal, and allowing or rejecting the access credential according to a predetermined schedule.

10. The non-transitory computer-readable tangible media of claim 9, wherein the ultrasonic signal is different in each repetition.

11. The non-transitory computer-readable tangible media of claim 8, wherein the second computing device is different from the third computing device.

12. The non-transitory computer-readable tangible media of claim 8, wherein the second computing device is same as the third device.

13. The non-transitory computer-readable tangible media of claim 8, wherein the third computing device is a smartphone.

14. The non-transitory computer-readable tangible media of claim 8, wherein the operations further comprise analyzing the audio data to determine proximity of the second computing device to the user.

15. An apparatus comprising:

a processing circuitry;

a memory storing data; and a communication circuitry, wherein the processing circuitry executes instructions associated with the data, the processing circuitry is coupled to the communication circuitry and the memory, and the processing circuitry and the memory cooperate, such that the apparatus is configured for:

initiating, at a first device remotely located from the apparatus over a cloud network, an instance of a virtual meeting in response to receiving access credential of a user;

responsive to initiating the instance, generating a cryptographic key unique to the user and the instance;

sending instructions to a device application executing in a second device associated with the user, the second device being remotely located from the apparatus over the cloud network, wherein the device application causes the second device to generate and emit an ultrasonic signal encoding the cryptographic key according to the instructions;

receiving in real time from the virtual meeting executing in the first device, audio data associated with the access credential;

searching the audio data for the ultrasonic signal;

responsive to finding the ultrasonic signal in the audio data, categorizing the access credential as authentic and allowing the access credential into the virtual meeting; and responsive to not finding the ultrasonic signal in the audio data, categorizing the access credential as unauthentic and rejecting the access credential from the virtual meeting.

16. The apparatus of claim 15, further configured for repeating sending the instructions to generate and emit the ultrasonic signal, receiving the audio data, searching the audio data for the ultrasonic signal, and allowing or rejecting the access credential according to a predetermined schedule.

17. The apparatus of claim 16, wherein the ultrasonic signal is different in each repetition.

18. The apparatus of claim 15, wherein the second device is different from the first device.

19. The apparatus of claim 15, wherein the first device is same as the second device.

20. The apparatus of claim 15, further configured for analyzing the audio data to determine proximity of the first device to the user.

* * * * *